US012763032B2

(12) United States Patent
Kim et al.

(10) Patent No.: US 12,763,032 B2
(45) Date of Patent: Oct. 13, 2026

(54) STAGE CIRCUIT, DISPLAY DEVICE INCLUDING THE SAME, AND ELECTRONIC DEVICE INCLUDING THE SAME

(71) Applicant: SAMSUNG DISPLAY CO., LTD., Yongin-si (KR)

(72) Inventors: Min Joo Kim, Yongin-si (KR); Kyung Hoon Kim, Yongin-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

(21) Appl. No.: 19/337,040

(22) Filed: Sep. 23, 2025

(65) Prior Publication Data

US 2026/0204225 A1 Jul. 16, 2026

(30) Foreign Application Priority Data

Jan. 10, 2025 (KR) ........................ 10-2025-0004115

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0852* (2013.01); *G09G 2310/0286* (2013.01); *G09G 2310/08* (2013.01)

(58) Field of Classification Search
CPC ............... G09G 3/3266; G09G 3/3233; G09G 2300/0852; G09G 2310/0286; G09G 2310/08
See application file for complete search history.

(56) References Cited

U.S. PATENT DOCUMENTS

| | | | | |
|---|---|---|---|---|
| 10,453,386 B2 * | 10/2019 | Jang | G09G 3/3266 |
| 11,037,493 B2 | 6/2021 | Chang | |
| 11,430,391 B2 | 8/2022 | Kwak et al. | |
| 12,094,394 B2 * | 9/2024 | In | G09G 3/2096 |
| 12,165,563 B2 * | 12/2024 | Park | G09G 3/2092 |
| 2016/0217728 A1 * | 7/2016 | In | G09G 3/2096 |
| 2017/0116920 A1 * | 4/2017 | Kwon | G09G 3/3266 |
| 2020/0118509 A1 * | 4/2020 | Noh | G11C 19/28 |
| 2022/0230591 A1 * | 7/2022 | Na | G09G 3/3275 |
| 2023/0177999 A1 * | 6/2023 | Park | G09G 3/2096 |
| 2023/0178027 A1 * | 6/2023 | In | G09G 3/3266 |
| 2023/0368741 A1 * | 11/2023 | Wang | G09G 3/3266 |
| 2023/0377504 A1 * | 11/2023 | In | G09G 3/2092 |
| 2023/0395032 A1 * | 12/2023 | Kang | G11C 19/28 |
| 2024/0194150 A1 * | 6/2024 | Noh | G09G 3/32 |

FOREIGN PATENT DOCUMENTS

| | | |
|---|---|---|
| KR | 10-2021-0158144 A | 12/2021 |
| KR | 10-2710287 B1 | 9/2024 |

* cited by examiner

*Primary Examiner* — Amy Onyekaba
(74) *Attorney, Agent, or Firm* — F. CHAU & ASSOCIATES, LLC

(57) ABSTRACT

A stage circuit includes a first input terminal configured to receive a clock signal, a second input terminal configured to receive a driving signal, an output terminal configured to output a carry signal, an input circuit configured to transmit the driving signal to a first node in response to the clock signal, a voltage control circuit that controls voltages of a first control node and a second control node in response to the driving signal transmitted to the first node, and a carry driver circuit including a boosting capacitor connected between the first control node and the output terminal, and a buffer capacitor configured to maintain the voltage of the output terminal.

20 Claims, 26 Drawing Sheets

STAGE CIRCUIT, DISPLAY DEVICE INCLUDING THE SAME, AND ELECTRONIC DEVICE INCLUDING THE SAME

This U.S. patent application claims priority under 35 U.S.C. § 119(a) to Korean Patent Application No. 10-2025-0004115, filed on Jan. 10, 2025, the disclosure of which is incorporated by reference in its entirety herein.

1. TECHNICAL FIELD

Embodiments of the present disclosure are directed to a stage circuit, a display device including the same, and an electronic device including the same.

2. DISCUSSION OF RELATED ART

With advancements in information technology, display devices serving as interfaces between users and information have become increasingly important. Accordingly, the adoption of various display devices such as liquid crystal display devices and organic light-emitting display devices, continues to grow.

The display device may include stage circuits to sequentially generate scan signals for controlling the timing of pixel activation in its display panel. For example, a preceding stage of the stage circuits may output a driving signal (e.g., a carry signal) that serves to trigger operation of a succeeding stage. The succeeding stage may receive the driving signal from the preceding stage and, in response, may generate a scan signal for driving a corresponding scan line, as well as a carry signal to activate the next stage in the sequence.

However, the falling edge of the carry signal is slow, which delays activation of subsequent stage circuits. This may lead to timing inefficiencies and potential display artifacts or reduced refresh rates in the driving of display devices. Further, the areas of the stage circuits are very large due to requiring large capacitors and complex layout. This can reduce the aperture ratio of the display and negatively impact visibility.

SUMMARY

At least one embodiment of the disclosure provides a stage circuit configured to shorten the falling time of a carry signal, as well as a display device including the stage circuit, and an electronic device including the display device.

At least one embodiment of the disclosure provides a stage circuit configured to enhance visibility, as well as a display device including the stage circuit, and an electronic device including the display device.

According to an embodiment of the present disclosure, a stage circuit includes a first input terminal to receive a clock signal, a second input terminal to receive a driving signal, an output terminal to output a carry signal, an input circuit configured to transmit the driving signal to a first node in response to the clock signal, a voltage control circuit configured to control voltages of a first control node and a second control node in response to the driving signal transmitted to the first node, and a carry driver circuit including a boosting capacitor connected between the first control node and the output terminal, and a buffer capacitor configured to maintain a voltage of the output terminal.

The input circuit may include a first transistor including a gate electrode electrically connected to the first input terminal, and configured to switch an electrical connection between the second input terminal and the first node.

The stage circuit may further include a third input terminal to receive a high level voltage, and a fourth input terminal to receive the low level voltage. The voltage control circuit may include a second transistor including a gate electrode electrically connected to the first node and configured to switch an electrical connection between the third input terminal and the second control node, a third transistor electrically connecting the first node and the first control node, a fourth transistor including a gate electrodes electrically connected to the first control node, and configured to switch an electrical connection between the fourth input terminal and the second control node, and a stabilizing capacitor including a first electrode electrically connected to the second control node and a second electrode electrically connected to third input terminals.

The buffer capacitor may be directly connected to the fourth input terminal.

The second transistor and the third transistor may be transistors including a P-type semiconductor, and the fourth transistor may be a transistor including an N-type semiconductor.

The third transistor may include a gate electrode electrically connected to the fourth input terminal.

The low level voltage input to the fourth input terminal may be a first low level voltage. The stage circuit may further include a seventh input terminal to receive a second low level voltage. The third transistor may include a gate electrode electrically connected to the seventh input terminal.

The second low level voltage may be lower than the first low level voltage.

The buffer capacitor may be directly connected to the seventh input terminal.

At least one of the second transistor, the third transistor, and the fourth transistor may have a four-terminal structure including a back gate electrode.

The output terminal may be a second output terminal. The stage circuit may further include a third input terminal to receive a high level voltage, a fourth input terminal to receive a low level voltage, a first output terminal to output a scan signal, and a scan output circuit configured to output the scan signal according to voltages of the first control node and the second control node. The scan output circuit may include a fifth transistor configured to switch an electrical connection between the third input terminal and the first output terminal in response to a voltage of the second control node, and a sixth transistor configured to switch an electrical connection between the fourth input terminal and the first output terminal in response the voltage of the first control node.

Each of the fifth transistor and the sixth transistor may include a P-type semiconductor.

The stage circuit may further include a third input terminal to receive a high level voltage, and a fourth input terminal to receive the low level voltage. The carry driver circuit may further include a seventh transistor including a gate electrode electrically connected to the second control node, and configured to switch an electrical connection between the third input terminal and the output terminal, and an eighth transistor including a gate electrodes electrically connected to the first control node and configured to switch an electrical connection between the fourth input terminal and the output terminal.

Each of the seventh transistor and the eighth transistor may include a P-type semiconductor.

The stage circuit may further include a fifth input terminal to receive a reset signal, a sixth input terminal to which a low level voltage is input, and a reset unit. The reset circuit may include a ninth transistor including a gate electrode electrically connected to the fifth input terminal, and configured to switch an electrical connection between the sixth input terminal and the second control node.

According to an embodiment of the present disclosure, a display device includes a display panel having a plurality of pixels and scan lines electrically connected to the plurality of pixels, and a scan driving circuit including a plurality of stage circuits configured to supply scan signals to the plurality of scan lines, wherein at least one of the plurality of the plurality of stage circuits includes a first input terminal to receive a clock signal is input, a second input terminal to receive a driving signal, a first output terminal to output a scan signal of the scan signals, a second output terminal to output a carry signal, an input circuit configured to transmit the driving signal to a first node in response to the clock signal, a voltage control circuit configured to control voltages of a first control node and a second control node in response to the driving signal input to the first node, a carry driver circuit including a boosting capacitor connected between the first control node and the output terminal, and a buffer capacitor configured to maintain a voltage of the second output terminal, and a scan output circuit configured to output the scan signal according to voltages of the first control node and the second control node.

The display device may further include a third input terminal to receive a high level voltage and a fourth input terminal to receive a low level voltage. The voltage control circuit may include a second transistor including a gate electrode electrically connected to the first node, and configured to switch an electrical connection between the third input terminal and the second control node, a third transistor electrically connecting the first node and the first control node, a fourth transistor including a gate electrode electrically connected to the first control node, and configured to switch an electrical connection between the fourth input terminal and the second control node, and a stabilizing capacitor including a first electrode electrically connected to the second control node and a second electrode electrically connected to a third input terminal.

The carry driver circuit may include a seventh transistor including a gate electrode electrically connected to the second control node, and configured to switch an electrical connection between the third input terminal and the output terminal, and an eighth transistor including a gate electrode electrically connected to the first control node, and configured to switch an electrical connection between the fourth input terminal and the output terminal.

According to an embodiment of the present disclosure, an electronic device includes a processor to output input image data, a display device that displays an image corresponding to the input image data according to a scan signal generated by a plurality of stage circuits, wherein at least one of the plurality of stage circuits includes a first input terminal to receive a clock signal, a second input terminal to receive a driving signal, a first output terminal to output the scan signal, a second output terminal to output a carry signal, an input circuit configured to transmit the driving signal to a first node in response to the clock signal, a voltage control circuit configured to control voltages of a first control node and a second control node in response to the driving signal transmitted to the first node, a carry driver circuit including a boosting capacitor connected between the first control node and the output terminal, and a buffer capacitor configured to maintain a voltage of the second output terminal, and a scan output circuit configured to output the scan signal according to voltages of the first control node and the second control node.

The processor may further output a control signal. The display device may generate a scan driving circuit control signal configured to control the driving timing of the stage circuits in response to the control signal.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
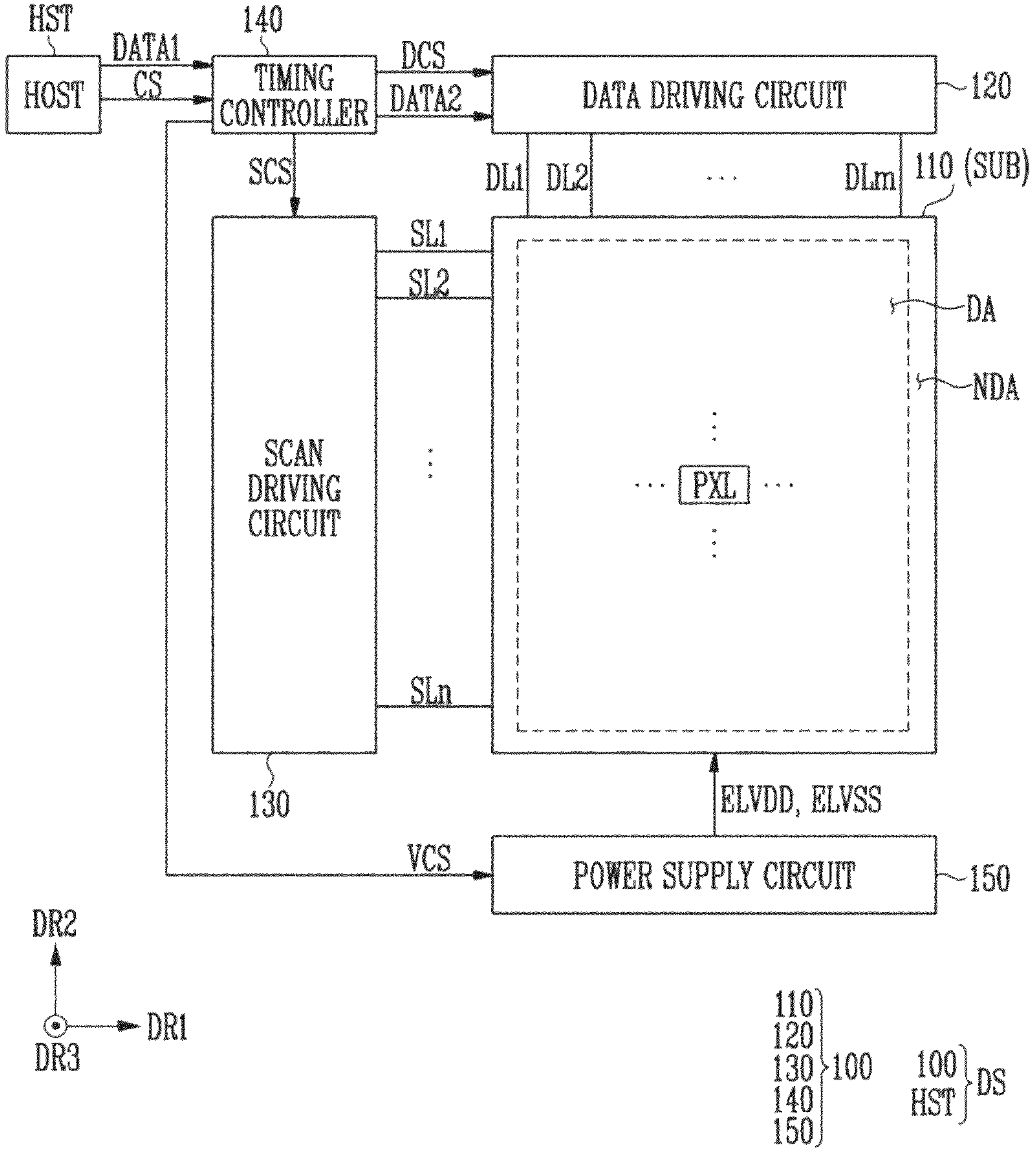
FIG. 1 is a system block diagram of an electronic device according to an embodiment of the present disclosure.

Hereinafter, various embodiments of the invention will be described in detail with reference to the accompanying drawings so that those skilled in the art may implement the embodiments. The invention may be embodied in many different forms and is not limited to the embodiments described herein.

In order to clearly explain the invention, parts not related to the description may be omitted, and the same or similar components are denoted by the same reference numerals throughout the specification. Accordingly, the aforementioned reference numerals may also be used in other drawings.

The expression "same" in the description may mean "substantially the same". In other words, it may be the same enough that a person with ordinary knowledge can understand that they are the same. Other expressions may also be those in which "substantially" is omitted.

The terms first, second, etc. may be used to describe various components, but the components should not be limited by the terms. The above terms are used only for the purpose of distinguishing one component from another. For example, a first component may be named a second component, and similarly, a second component may also be named a first component, without departing from the scope of the invention. The singular forms "a", "an", and "the" include plural references unless the context clearly requires otherwise.

The terms "below", "under," "above", "on", and the like are used to describe the association of the components shown in the figures. The above terms are relative concepts and are explained with reference to the directions indicated in the drawings.

It is to be understood that the terms "comprise" or "have" and the like are intended to designate the presence of a feature, number, step, operation, component, part, or combination thereof described in the specification, and do not preclude the presence or possibility of addition of one or more other features, numbers, steps, operations, components, parts, or combinations thereof.

At least one embodiment of the invention is directed to a stage circuit used in a scan driver of a display device, which controls the timing of scan signals applied to rows of pixels during image rendering. The stage circuit includes a carry signal path that incorporates a boosting capacitor connected between an internal node of the circuit and a carry output terminal, along with a buffer capacitor that helps maintain the voltage level at the carry output. This arrangement accelerates the falling edge of the carry signal, allowing scan signals to propagate more quickly through successive stages, which optimizes the driving speed and timing accuracy of the display. Furthermore, the configuration enables the use of a smaller buffer capacitor without compromising performance, reducing the physical area of the circuit and enhancing the display's aperture ratio and overall visibility.

Hereinafter, embodiments of the disclosure will be described in detail with reference to the accompanying drawings.

FIG. 1 is a system block diagram of an electronic device DS according to an embodiment of the present disclosure.

Referring to FIG. 1, a display device 100 according to embodiments of the present disclosure may include a display panel 110, a data driving circuit 120, a scan driving circuit 130, a power supply circuit 150 and a timing controller 140 (e.g., a controller circuit).

The display panel 110 may include a substrate SUB. The display panel 110 may include a display area DA in which a plurality of pixels PXL are located on the substrate SUB, and a non-display area NDA around the display area DA. A plurality of data lines DL1 to DLm (m is an integer of 2 or more) and a plurality of scan lines SL1 to SLn (n is an integer of 2 or more) electrically connected to the plurality of pixels PXL may be disposed in the display panel 110 (or in the display area DA). One or more power lines configured to apply a power supply voltage to a plurality of pixels PXL may be disposed on the display panel 110. The non-display area NDA may be located in an area around or adjacent to the display area DA (e.g., an edge area of the display area DA). One or more pads may be located in the non-display area NDA, and a data voltage and a power supply voltage may be supplied to the plurality of data lines DL1 to DLm through the pads.

The display panel 110 may be formed as flat panel, but embodiments of the present disclosure are not limited thereto. For example, the display panel 110 may include curved portions formed at left and right ends. A curved surface may have a constant curvature or a varying curvature. In addition, the display panel 110 may be flexibly formed to be bent, bent, bent, folded, or rolled.

In one embodiment, the substrate SUB may comprise a rigid glass substrate. However, embodiments of the present disclosure are not limited thereto, and may include a flexible plastic substrate. For example, the plastic substrate may be implemented as a polyimide (PI) substrate. In other embodiments, the substrate SUB may be implemented as a silicon substrate.

The plurality of data lines DL1 to DLm may extend in one direction across the display panel 110, such as in a second direction DR2. The second direction DR2 may be, for example, a direction from the upper side to the lower side of the display panel 110, but embodiments of the present disclosure are not limited thereto.

The plurality of scan lines SL1 to SLn may extend in one direction across the display panel 110, such as in a first direction DR1. The first direction DR1 may be a direction that is different from the second direction DR2, but embodiments of the present disclosure are not limited thereto. The first direction DR1 may correspond, for example, to a direction extending from the left side to the right side of the display panel 110.

The data driving circuit 120 may be configured to supply a data voltage to the plurality of data lines DL1 to DLm. The data driving circuit 120 may generate a data voltage based on the second image data DATA2 and the data driving circuit control signal DCS, and may output the generated data voltage to the plurality of data lines DL1 to DLm in accordance with a predetermined timing. The data driving circuit control signal DCS may include, for example, a Source Start Pulse (SSP) signal, a Source Shift Clock (SSC) signal, and a Source Output Enable (SOE) signal. The data driving circuit 120 may be implemented as an integrated circuit (e.g., a source driver integrated circuit (SDIC)) formed separately from the display panel 110, or may be formed together with the display panel 110 in at least a partial area on a non-display area NDA of the display panel 110.

The scan driving circuit 130 is configured to output a scan signal to the plurality of scan lines SL1 to SLn in response to the scan driving circuit control signal SCS. The scan driving circuit control signal SCS may include a start signal indicating the start of the frame and a horizontal synchronization signal for outputting the scan signal in accordance with the timing at which the data voltage is applied.

The scan driving circuit 130 may be implemented as an integrated circuit (e.g., a gate driving integrated circuit (GDIC)) formed separately from the display panel 110, or may be formed together with the display panel 110 to be formed in at least a part of a non-display area NDA of the display panel 110.

The power supply circuit 150 may be configured to output a constant voltage at a constant voltage level. The power supply circuit 150 may output a power supply voltage (for example, a first power supply voltage ELVDD or a second power supply voltage ELVSS) supplied to the display panel 110. According to an embodiment, the power supply circuit 150 may output a voltage (e.g., a gate high voltage or a gate low voltage) supplied to the scan driving circuit 130. According to an embodiment, the power supply circuit 150 may output a voltage (e.g., a gamma voltage) supplied to the data driving circuit 120. The power supply circuit 150 may include, for example, a regulator (e.g., a Low Dropout (LDO) regulator). The power supply circuit 150 may be implemented, for example, as a power management integrated circuit (PMIC). The power supply circuit 150 may be configured to output a power supply voltage (e.g., ELVDD and ELVSS) to power lines in response to the power supply circuit control signal VCS.

The timing controller 140 may be configured to control the data driving circuit 120, the scan driving circuit 130 and the power supply circuit 150. The timing controller 140 may generate and output control signals DCS, SCS, and VCS for controlling the data driving circuit 120, the scan driving circuit 130, and the power supply circuit 150 based on the control signal CS (e.g., a synchronization signal, a clock signal or a data enable signal) received from the host HST. According to an embodiment, the timing controller 140 may generate a synchronization signal or a data enable signal based on the control signal CS (for example, information on a driving frequency (or a frame rate) of an image displayed on the display panel 110) received from the host HST.

The timing controller 140 may receive the first image data DATA1 from the host HST and may align the received first image data DATA1 in units of pixel rows. The timing controller 140 may convert the input first image data DATA1 according to a preset interface (for example, a Low Voltage Differential Signaling (LVDS), a Display Port (DP) or an embedded Display Port (eDP)). The second image data DATA2 output by the timing controller 140 to the data driving circuit 120 may be converted inside the timing controller 140 according to a preset interface.

According to an embodiment, the timing controller 140 may be arranged in the display device 100 either as a logic type circuit or as a processor type circuit. The timing controller 140 may include one or more memories (e.g., registers).

The host HST may include a set-top box or an application processor (AP). In an embodiment, the host HST may be an external component that is not integrated within the display device 100. In an embodiment, the host HST may be mounted in the display device 100. The first image data DATA1 and the control signal CS may be transmitted and received between the host HST and the display device 100 through an interface. The interface may be, for example, a Serial Programming Interface (SPI), an Inter Integrated Circuit (I2C) or a Mobile Industry Processor Interface (MIPI). However, embodiments of the present disclosure are not limited thereto.

An electronic device DS according to embodiments of the present disclosure may include the display device 100 and the host HST.

In FIG. 1, the circuits that supply signals and voltages to the display panel 110 may be classified according to their functional roles. For example, the data driving circuit 120 and the timing controller 140 may be integrated together in a single integrated circuit. The data driving circuit 120 and the timing controller 140 may be functionally integrated within a single integrated circuit in the display device 100.

The display device 100 according to embodiments of the present disclosure may be used as a display screen of various products such as a mobile phone, a smart phone, a tablet personal computer (PC), and a portable electronic device such as a smart watch, a watch phone, a mobile communication terminal, an electronic notebook, an electronic book, a portable multimedia player (PMP), navigation and an ultra-mobile personal computer (UMPC), as well as a television, a notebook, a monitor, an advertisement board and an Internet of Things (IoT) device.

Figure 2:
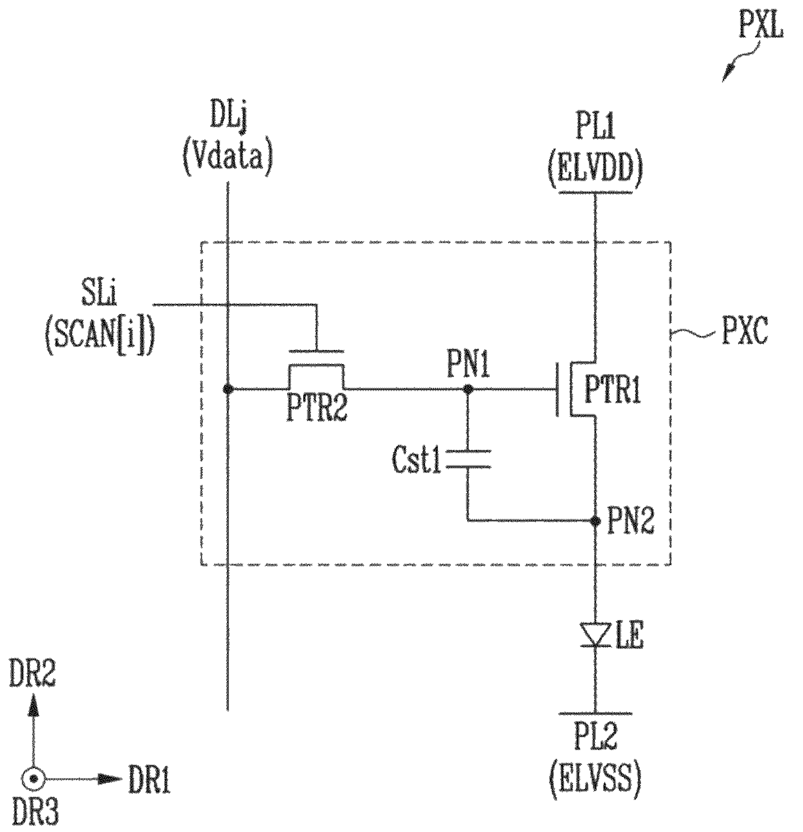
FIG. 2 is an equivalent circuit diagram of a pixel according to an embodiment.

FIG. 2 is an equivalent circuit diagram of a pixel PXL of the display panel 110 according to an embodiment.

Referring to FIG. 2, a pixel PXL according to embodiments of the present disclosure may include a pixel driving circuit PXC and a light-emitting element LE.

The pixel driving circuit PXC may comprise two or more switching elements and one or more storage elements. In one embodiment, the switching element may be implemented as a transistor. In one embodiment, the storage element may be implemented as a capacitor.

In an embodiment, the transistor may be implemented as a Bipolar Junction Transistor (BJT), a Field Effect Transistor (FET), or the like, but the embodiments of the present disclosure are not limited thereto.

Referring to FIG. 2, the pixel driving circuit PXC according to an embodiment may include first and second pixel transistors PTR1, PTR2 and a storage capacitor Cst1 (e.g., a first storage capacitor Cst1). However, according to an embodiment, the pixel driving circuit PXC may include three or more transistors, or may include two or more capacitors.

The first pixel transistor PTR1 may include a gate electrode electrically connected to the first pixel node PN1. The first pixel transistor PTR1 may include a first electrode (e.g., any one of a source electrode and a drain electrode) electrically connected to the first power line PL1, and a second electrode (e.g., the other one of the source electrode and the drain electrode) electrically connecting to the light-emitting element LE. The first pixel transistor PTR1 may provide a driving current corresponding to a voltage applied to the first pixel node PN1 to the light-emitting element LE. A first power supply voltage ELVDD may be applied to the first power line PL1. The first power supply voltage ELVDD may be a high potential voltage. The second pixel transistor PTR2 may be configured to switch the electrical connection between the j-th data line DLj (j is an integer greater than or equal to 1) and the first pixel node PN1 in response to an i-th scan signal SCAN[i] (hereinafter, also referred to as a scan signal SCAN[i]) applied to the i-th scan line SLi. When the second pixel transistor PTR2 is turned on in response to the scan signal SCAN[i] having a turn-on level (e.g., a high level), a data voltage Vdata may be written to the pixel driving circuit PXC. A data voltage Vdata or a voltage corresponding to the data voltage Vdata may be applied to the first pixel node PN1.

The storage capacitor Cst1 may include a first electrode electrically connected with the first pixel node PN1 and a second electrode electrically connected with a second pixel node PN2. The second pixel node PN2 may be a node electrically connected to the first pixel transistor PTR1 and the light-emitting element LE. In an embodiment, the first electrode and the second electrode may be located in the same layer as each other. In other embodiments, the first electrode and the second electrode may be located in different layers. In an embodiment in which the first electrode and the second electrode are located on different layers, the first electrode and second electrode may be located to overlap each other in a vertical direction.

The light-emitting element LE may emit light according to a driving current flowing through the first pixel transistor PTR1. The driving current may flow from the first power line PL1 in the direction of the second power line PL2. The light-emitting element LE may include an anode electrode, a cathode electrode, and a light-emitting layer. The anode electrode may be electrically connected to the first power line PL1. The cathode electrode may be electrically connected to the second power line PL2. In one embodiment, the light-emitting layer may be located between the anode electrode and the cathode electrode. According to an embodiment, the light-emitting layer may be implemented as an organic light-emitting layer comprising an organic light-emitting material. However, the embodiments of the present disclosure are not limited thereto, and the light-emitting layer may include an inorganic light-emitting material, a quantum dot, a nanorod, or the like. Referring to FIG. 2, the anode electrode may be electrically connected to the second pixel node PN2.

Referring to FIG. 2, a pixel driving circuit PXC according to embodiments of the present disclosure may include a transistor including at least one N-type semiconductor. For example, at least one of the first pixel transistor PTR1 and the second pixel transistor PTR2 may be implemented as a transistor including an N-type semiconductor. A transistor including an N-type semiconductor may be turned on in response to a high level of voltage and turned off in response to a low level of voltage.

However, the pixel PXL according to the embodiments of the present disclosure is not limited to a structure having two transistors and one capacitor. According to an embodiment, the scan signal SCAN[i] may be applied to a scan line SLi for controlling the emission timing of the light-emitting element LE. According to an embodiment, the scan signal SCAN[i] may be applied to scan line SLi for controlling the timing at which an initialization voltage is applied to the anode electrode of the light-emitting element LE. According to an embodiment, the scan signal SCAN[i] may be applied to the scan line SLi for controlling timing at which an initialization voltage is applied to the gate electrode of the first pixel transistor PTR1. According to an embodiment, the scan signal SCAN[i] may be applied to the scan line SLi for controlling timing at which a bias voltage is applied to the source electrode of the first pixel transistor PTR1. However, the embodiments of the present disclosure are not limited thereto.

Figure 3:
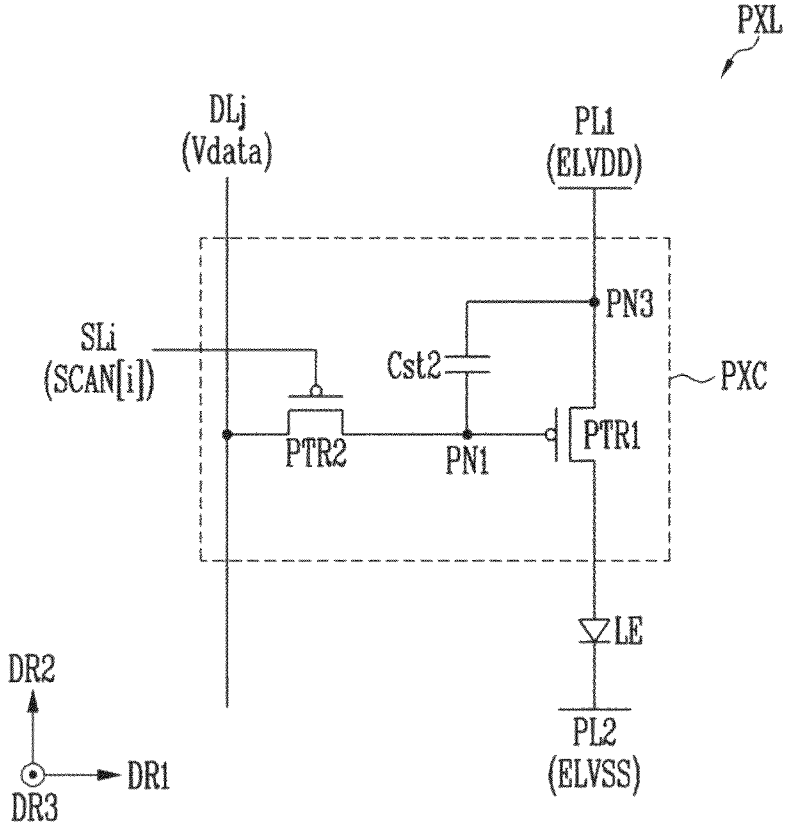
FIG. 3 is an equivalent circuit diagram of a pixel according to an embodiment.

FIG. 3 is an equivalent circuit diagram of the pixel PXL according to an embodiment.

Referring to FIG. 3, a pixel driving circuit PXC according to embodiments of the present disclosure may include a first pixel transistor PTR1, a second pixel transistor PTR2, and a storage capacitor Cst2.

Compared with the embodiment of FIG. 2, at least one of the first pixel transistor PTR1 and the second pixel transistor PTR2 may be implemented as a transistor including a P-type semiconductor. A transistor including a P-type semiconductor may be turned on in response to a low level of voltage and turned off in response to a high level of voltage.

The first pixel transistor PTR1 may include a gate electrode electrically connected to the first pixel node PN1. The first pixel transistor PTR1 may include a first electrode (e.g., any one of a source electrode and a drain electrode) electrically connected to the first power line PL1, and a second electrode (e.g., the other one of the source electrode and the drain electrode) electrically connecting to the light-emitting element LE. The first pixel transistor PTR1 may provide a driving current corresponding to a voltage applied to the first pixel node PN1 to the light-emitting element LE. A first power supply voltage ELVDD may be applied to the first power line PL1. The first power supply voltage ELVDD may be a high potential voltage.

The second pixel transistor PTR2 may be configured to switch the electrical connection between the j-th data line DLj (j is an integer greater than or equal to 1) and the first pixel node PN1 in response to the scan signal SCAN[i] applied to the i-th scan line SLi (i is an integer greater than or equal to 1). When the second pixel transistor PTR2 is turned on in response to the scan signal SCAN[i] having turn-on level (e.g., a low level), a data voltage Vdata or a voltage corresponding to the data voltage Vdata may be applied to the first pixel node PN1.

In an embodiment, the storage capacitor Cst2 (e.g., the second storage capacitor Cst2) may include a first electrode electrically connected with the first pixel node PN1 and a second electrode electrically connected with a third pixel node PN3. The third pixel node PN3 may be a node to which the source electrode of the first pixel transistor PTR1 and the first power line PL1 are connected.

Figure 4:
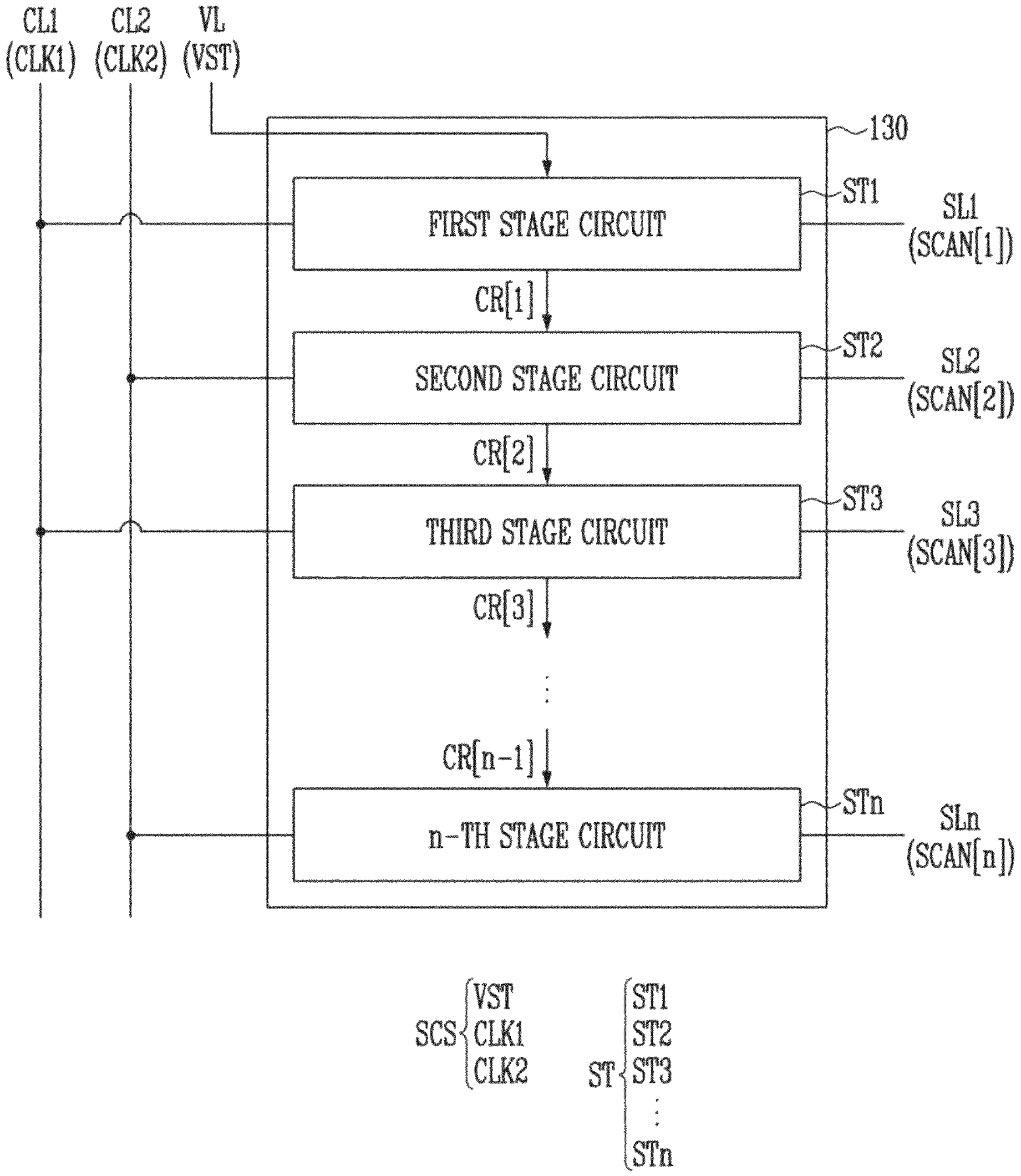
FIG. 4 is a system block diagram of a scan driving circuit according to an embodiment of the present disclosure.

FIG. 4 is a system block diagram of a scan driving circuit 130 according to an embodiment of the present disclosure.

Referring to FIG. 4, the scan driving circuit 130 according to an embodiments of the present disclosure includes several stage circuits ST.

In an embodiment, the stage circuits ST may include first to n-th stage circuits ST1, ST2, ST3, . . . , and STn (hereinafter ST1 to STn).

The first to n-th stage circuits ST1 to STn may be connected with a corresponding one of the first to n-th scan lines SL1 to SLn. The first to n-th stage circuits ST1 to STn may output a corresponding one of the first to n-th scan signals SCAN[1], SCAN[2], SCAN[3], . . . , SCAN[n] (hereinafter SCAN[1] to SCAN[n]).

The first to n-th scan signals SCAN[1] to SCAN[n] may have a turn-on level or a turn-off level. According to an embodiment, the turn-on level may be either a high level or a low level. The turn-off level may be the other of a high level and a low level.

The scan driving circuit 130 may be connected to the first clock line CL1, the second clock line CL2, and the start line VL. The first clock signal CLK1 may be applied to the first clock line CL1. A second clock signal CLK2 may be applied to the second clock line CLK2. A start signal VST may be applied to the start line VL. The first clock signal CLK1, the second clock signal CLK2, and the start signal VST may be included in the scan driving circuit control signal SCS.

In an embodiment, the first stage circuit ST1 may be electrically connected to the first clock line CL1 and the start line VL. The first stage circuit ST1 may output the first scan signal SCAN[1] to the first scan line SL1. The first stage circuit ST1 may output the first carry signal CR[1].

In an embodiment, the second stage circuit ST2 may be electrically connected with the second clock line CL2. The second stage circuit ST2 may receive the first carry signal CR[1] from the first stage circuit ST1. The second stage circuit ST2 may output a second scan signal SCAN[2] to the second scan line SL2. The second stage circuit ST2 may output a second carry signal CR[2].

In an embodiment, the third stage circuit ST3 may be electrically connected to the first clock line CL1. The third stage circuit ST3 may receive the second carry signal CR[2] from the second stage circuit ST2. The third stage circuit ST3 may output the third scan signal SCAN[3] to the third scan line SL3. The third stage circuit ST3 may output the third carry signal CR[3].

In an embodiment, the n-th stage circuit STn may be electrically connected with the second clock line CL2. The n-th stage circuit STn may receive the (n−1)-th carry signal CR[n−1] from the (n−1)-th stage circuit. The n-th stage circuit STn may output the n-th scan signal SCAN[n] to the n-th scan line SLn.

In an embodiment, the odd-numbered ones of the first to n-th stage circuits ST1 to STn may be electrically connected to the first clock line CL1. In an embodiment, even-numbered ones of the first to n-th stage circuits ST1 to STn may be electrically connected with the second clock line CL2.

Figure 5:
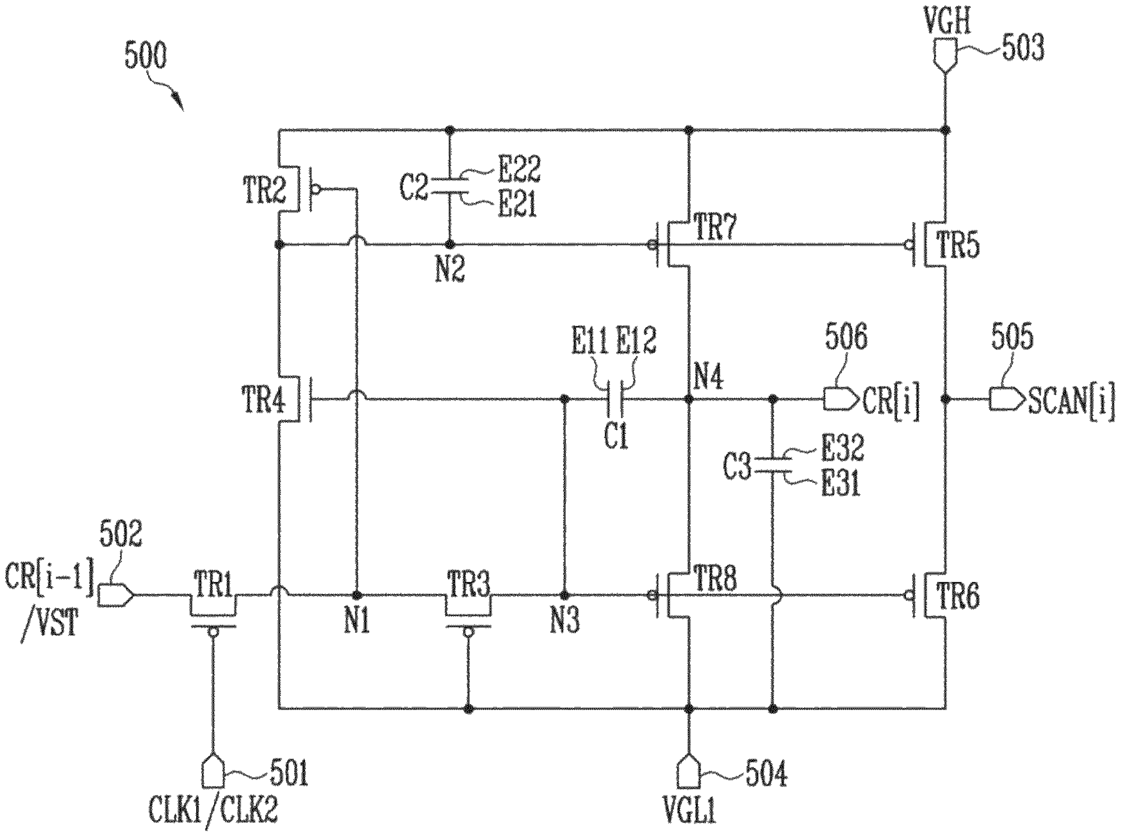
FIG. 5 is an equivalent circuit diagram of a stage circuit according to an embodiment.

FIG. 5 is an equivalent circuit diagram of a stage circuit 500 according to an embodiment.

The stage circuit 500 of FIG. 5 may correspond to any one of the first to n-th stage circuits ST1 to STn of FIG. 4.

Referring to FIG. 5, a stage circuit 500 according to an embodiment of the present disclosure may include one or more input terminals, one or more output terminals, one of more switching elements, and one or more storage elements.

In one embodiment, the switching element may be implemented as a transistor. In one embodiment, the storage element may function as a capacitor.

In one embodiment, the stage circuit 500 may include eight transistors and three capacitors. However, embodiments of the present disclosure are not limited thereto.

The stage circuit 500 according to an embodiment of the present disclosure may include a first input terminal 501, a second input terminal 502, a third input terminal 503, and a fourth input terminal 504. The stage circuit 500 may include a first output terminal 505 and a second output terminal 506. The stage circuit 500 may include first to eighth transistors TR1 to TR8. The stage circuit 500 may include first to third capacitors C1 to C3.

Any one of the first clock signal CLK1 and the second clock signal CLK2 may be input to the first input terminal 501.

Any one of the start signal VST and the (i−1)-th carry signal CR[i−1] may be input to the second input terminal 502. In an embodiment of the present disclosure, the start signal VST or the (i−1)-th carry signal CR[i−1] input to the second input terminal 502 may be referred to as a driving signal.

A high level voltage VGH may be input to the third input terminal 503.

A low level voltage VGL1 may be input to the fourth input terminal 504.

A scan signal SCAN[i] may be output to the first output terminal 505.

An i-th carry signal CR[i] may be output to the second output terminal 506.

The first transistor TR1 may include a gate electrode electrically connected to the first input terminal 501. The first transistor TR1 may be configured to switch an electrical connection between the second input terminal 502 and the first node N1 in response to a signal input to the first input terminal 501. When the first transistor TR1 is turned on, a driving signal (for example, the start signal VST or the (i−1)-th carry signal CR[i−1]) may be input to the first node N1.

The second transistor TR2 may include a gate electrode electrically connected to the first node N1. The second transistor TR2 may be configured to switch an electrical connection between the third input terminal 503 and the second node N2. When the second transistor TR2 is turned on, a high level voltage VGH may be input to the second node N2.

The third transistor TR3 may include a gate electrode electrically connected to the fourth input terminal 504. When the third transistor TR3 is turned on, the first node N1 and the third node N3 may be electrically connected.

The fourth transistor TR4 may include a gate electrode electrically connected to the third node N3. The fourth transistor TR4 may be configured to switch an electrical connection between the fourth input terminal 504 and the second node N2. When the fourth transistor TR4 is turned on, the low level voltage VGL1 may be input to the second node N2.

The fifth transistor TR5 may include a gate electrode electrically connected to the second node N2. The fifth transistor TR5 may be configured to switch an electrical connection between the third input terminal 503 and the first output terminal 505. When the fifth transistor TR5 is turned on, a high level voltage VGH may be input to the first output terminal 505. In embodiments of the present disclosure, the second node N2 may be referred to as a QB node (e.g., a second control node). The fifth transistor TR5 may be referred to as a scan pull-up transistor.

The sixth transistor TR6 may include a gate electrode electrically connected to the third node N3. The sixth transistor TR6 may be configured to switch or control an electrical connection between the fourth input terminal 504 and the first output terminal 505. When the sixth transistor TR6 is turned on, a low level voltage VGL1 may be input to the first output terminal 505. In the embodiments of the present disclosure, the third node N3 may be referred to as a Q node (e.g., a first control node). The sixth transistor TR6 may be referred to as a scan pull-down transistor.

The seventh transistor TR7 may include a gate electrode electrically connected to the second node N2. The seventh transistor TR7 may be configured to switch or control an electrical connection between the third input terminal 503 and the fourth node N4. When the seventh transistor TR7 is turned on, a high level voltage VGH may be input to the fourth node N4. The seventh transistor may be referred to as a carry pull-up transistor.

The eighth transistor TR8 may include a gate electrode electrically connected to the third node N3. The eighth transistor TR8 may be configured to switch or control an electrical connection between the fourth input terminal 504 and the fourth node N4. When the eighth transistor TR8 is turned on, a low level voltage VGL1 may be input to the fourth node N4. The eighth transistor may be referred to as a carry pull-down transistor.

In an embodiment, at least one of the first to eighth transistors TR1 to TR8 may be implemented as a transistor including a P-type semiconductor. In an embodiment, at least one of the first to eighth transistors TR1 to TR8 may be implemented as a transistor including an N-type semiconductor.

Referring to FIG. 5, the first to third transistors TR1 to TR3 and the fifth to eighth transistors TR5 to TR8 may be implemented as transistors including a P-type semiconductor. The fourth transistor TR4 may be implemented as a transistor including an N-type semiconductor. However, embodiments of the present disclosure are not limited thereto.

The first capacitor C1 may be configured to maintain a potential difference between the third node N3 and the fourth node N4. The first capacitor C1 may include a first electrode E11 electrically connected to the third node N3 and a second electrode E12 electrically connected to the fourth node N4. The first capacitor C1 may perform a function of lowering or raising the voltage applied to the third node N3 to simultaneously lower or raise the voltage applied to a fourth node N4. The first capacitor C1 may be referred to as, or function as, a boosting capacitor.

The second capacitor C2 may be configured to maintain a voltage applied to the second node N2. In an embodiment, the second capacitor C2 may include a first electrode E21 electrically connected with the second node N2 and a second electrode E22 electrically connected with the third input terminal 503. The second capacitor C2 may help prevent ripple voltage at the second node N2 from affecting the operation of other transistors (e.g., the fifth transistor TR5 and the seventh transistor TR7). The second capacitor C2 may be referred to as, or function as, a stabilizing capacitor.

The third capacitor C3 may be configured to maintain a voltage applied to the fourth node N4. In an embodiment, the third capacitor C3 may include a first electrode E31 electrically connected with the fourth input terminal 504 and a second electrode E32 electrically connected with the fifth node N4. The third capacitor C3 is discharged in the process of lowering the voltage of the fourth node N4, so that the level of the voltage output to the second output terminal 506 may be effectively lowered. The third capacitor C3 may be referred to as, or function as, a buffer capacitor.

In the third capacitor C3, according to the embodiments of the present disclosure, the second electrode E32 is not connected to the first output terminal 505, but may instead be connected to the second output terminal 506. In the embodiments of the present disclosure, when compared to an example in which the second electrode E32 of the third capacitor C3 is connected to the first output terminal 505, the capacitance of the third capacitor C3 may be reduced. As a result, the voltage at the fourth node N4 may decrease more quickly.

The stage circuit 500 may include an input unit (e.g.m an input circuit) configured to receive the (i−1)-th carry signal CR[i−1] or the start signal VST. The input circuit may comprise a first transistor TR1.

The stage circuit 500 may include a signal processing unit (e.g., a voltage control circuit) configured to control voltages of a Q node (e.g., the third node N3) and a QB node (e.g., the second node N2). The signal processing unit may include a second transistor TR2, a third transistor TR3, a fourth transistor TR4, and a second capacitor C2. The signal processing unit may be connected to the input unit at the first node N1.

The stage circuit 500 may include a scan output configured to output the i-th scan signal SCAN[i]. The scan output may include a fifth transistor TR5 and a sixth transistor TR6. The scan output unit may be connected to the signal processing unit at the second node N2. The scan output unit may be connected to the signal processing unit at the third node N3.

The stage circuit 500 may include a carry output configured to output an i-th carry signal CR[i]. The carry output may include a seventh transistor TR7, an eighth transistor TR8, a first capacitor C1, and a third capacitor C3. The carry output unit (e.g., a carry driver circuit) may be connected to the signal processing unit at the second node N2. The carry output unit may be connected to the signal processing unit at the third node N3.

In an embodiment, at least one of the first to eighth transistors TR1 to TR8 may have a dual gate structure in which two sub-transistors are connected in series with each other, and the gate electrodes of these sub-transistors are connected in common.

Figure 6:
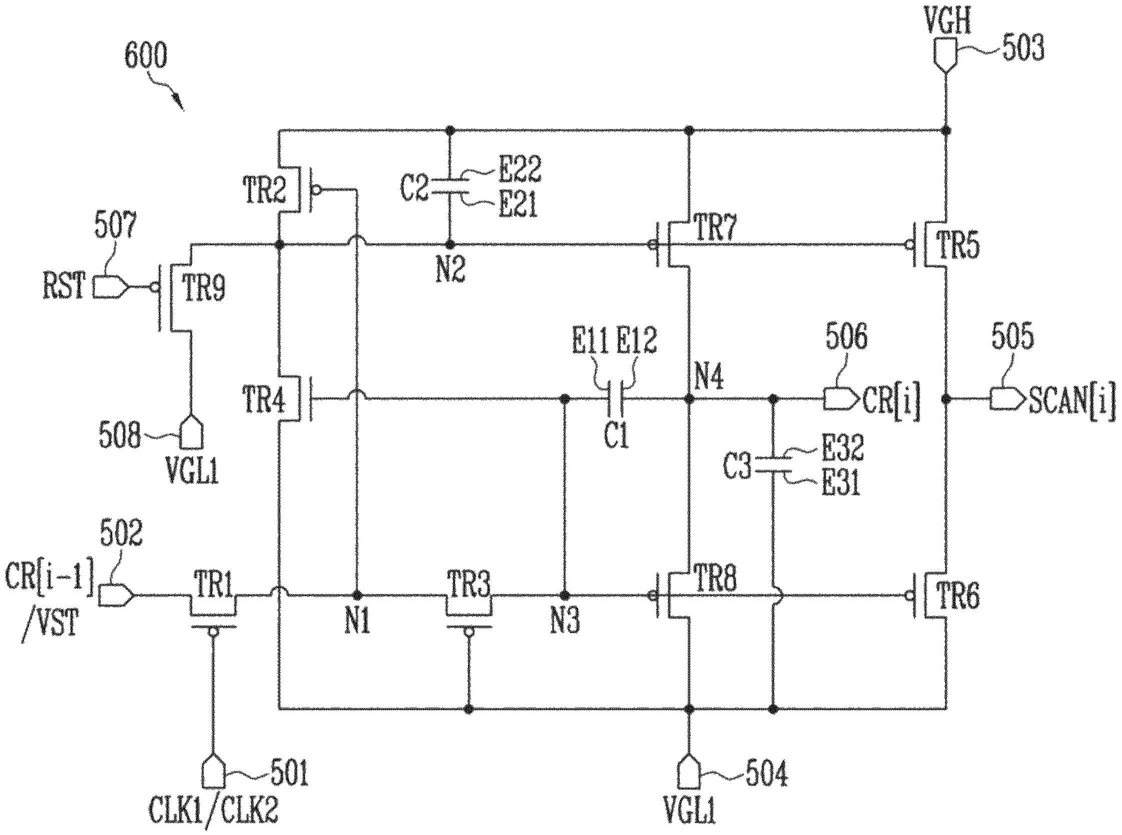
FIG. 6 is an equivalent circuit diagram of a stage circuit according to an embodiment.

FIG. 6 is an equivalent circuit diagram of a stage circuit 600 according to an embodiment.

Compared with FIG. 5, the stage circuit 600 according to the embodiment of FIG. 6 further includes a fifth input terminal 507, a sixth input terminal 508, and a ninth transistor TR9. The remaining configurations are as described in FIG. 5, and a description thereof is therefore omitted.

A reset signal RST may be input to the fifth input terminal 507. In embodiments of the present disclosure, the scan driving circuit control signal SCS may further include a reset signal RST. In one embodiment, the reset signal RST may be a signal having a turn-on level when the electronic device DS (see FIG. 1) is turned off and then restarted again.

A low level voltage VGL1 may be input to the sixth input terminal 508.

The ninth transistor TR9 may include a gate electrode electrically connected to the fifth input terminal 507. The ninth transistor TR9 may be configured to switch or control an electrical connection between the sixth input terminal 508 and the second node N2. When the ninth transistor TR9 is turned on, the low level voltage VGL1 may be input to the second node N2.

In an embodiment, the ninth transistor TR9 may be implemented as a transistor including a P-type semiconductor. However, embodiments of the present disclosure are not limited thereto, and the ninth transistor TR9 may be implemented as a transistor including an N-type semiconductor.

The stage circuit 500 may further include a reset unit (e.g., a reset circuit). The reset unit may include a ninth transistor TR9.

Figure 7:
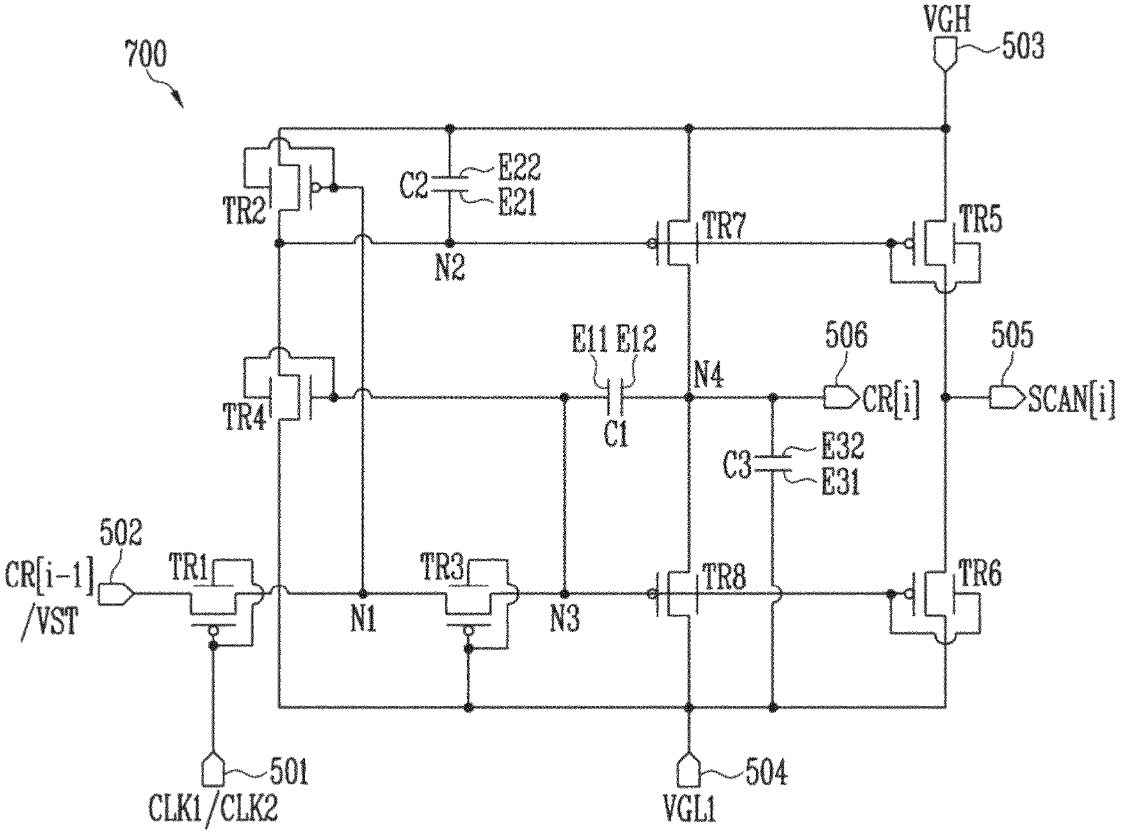
FIG. 7 is an equivalent circuit diagram of a stage circuit according to an embodiment.

FIG. 7 is an equivalent circuit diagram of a stage circuit 700 according to an embodiment.

Compared to FIG. 5, the stage circuit 700 according to the embodiments of FIG. 7 may be implemented with a four-terminal structure in which one or more transistors include a gate electrode, a source electrode, a drain electrode, and a back gate electrode.

In the above embodiment, the gate electrode of the transistor may be connected to the back gate electrode. According to this, a change in a characteristic value of the transistor (for example, a threshold voltage or mobility of the transistor) may be mitigated.

Referring to FIG. 7, each of the first through eighth transistors TR1 through TR8 is shown to include a back gate electrode. However, embodiments of the present disclosure are not limited thereto. For example, at least one of the first to eighth transistors TR1 to TR8 may be implemented with a three-terminal structure that does not include a back gate electrode, and the other may be implemented with the four-terminal structure that includes a back gate electrode.

With further reference to FIG. 6, the ninth transistor TR9 may be implemented with a three-terminal structure without a back gate electrode, or may be implemented with four-terminal structure including a back gate electrode.

Figure 8:
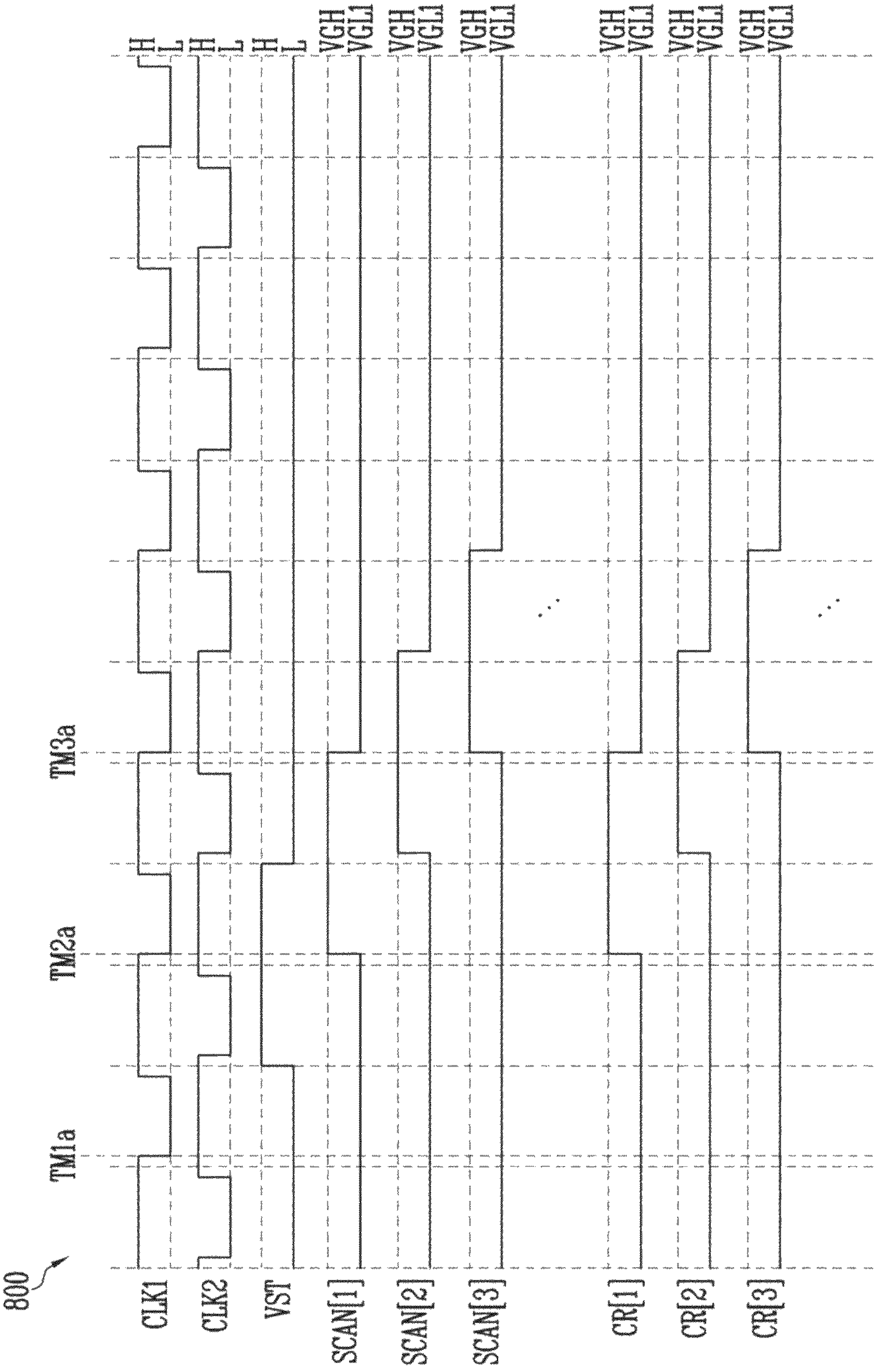
FIG. 8 is a timing diagram of a method of driving a scan driving circuit according to an embodiment.

FIG. 8 is a timing diagram of a method 800 of driving a scan driving circuit according to an embodiment.

The driving method 800 of the scan driving circuit according to embodiments of the present disclosure may be referred to as a driving method 800, a driving method 800 of a display device or a driving method of an electronic device.

Referring to FIG. 8, a first clock signal CLK1, a second clock signal CLK2, and a start signal VST input to the scan driving circuit 130 (see FIG. 4) are shown. Then, the scan signals SCAN[1], SCAN[2], SCAN[3], . . . generated by the first clock signal CLK1, the second clock signal CLK2, and the start signal VST, and the carry signals CR[1], CR[2], CR[3], . . . are shown.

Based on the first scan signal SCAN[1] and the first carry signal CR[1], a first time point TM1*a* (e.g., a first-a time point TM1*a*), a second time point TM2*a* (e.g., a second-a time point TM2*a*), and a third time point TM3*a* (e.g., a third-a time point TM3*a*) are described.

At the first time point TM1*a*, the first clock signal CLK1 transitions from the high level H to the low level L, and the start signal VST may have the low level L. At a first time point TM1*a*, the first scan signal SCAN[1] may have a low level voltage VGL1. At a first time point TM1*a*, the first carry signal CR[1] may have a low level voltage VGL1.

At the second time point TM2*a*, the first clock signal CLK1 transitions from the high level H to the low level L, and the start signal VST may have the high level H. At a second time point TM2*a*, the first scan signal SCAN[1] may rise from the low level voltage VGL1 to the high level voltage VGH. At the second time point TM2*a*, the first carry signal CR[1] may rise from the low level voltage VGL1 to the high level voltage VGH.

At the third time point TM3*a*, the first clock signal CLK1 transitions from the high level H to the low level L, and the start signal VST may have the low level L. At a third time point TM3*a*, the first scan signal SCAN[1] may drop from the high level voltage VGH to the low level voltage VGL1. At a third time point TM3*a*, the first carry signal CR[1] may drop from the high level voltage VGH to the low level voltage VGL1.

Referring to FIG. 8, in an embodiment of the present disclosure, the first scan signal SCAN[1] and the second scan signal SCAN[2] overlap during a period in which a signal of a high level voltage VGH is input. The first scan signal SCAN[1] and the third scan signal SCAN[3] may be non-overlapping during the period in which the signal of the high level voltage VGH is input.

Figure 9:
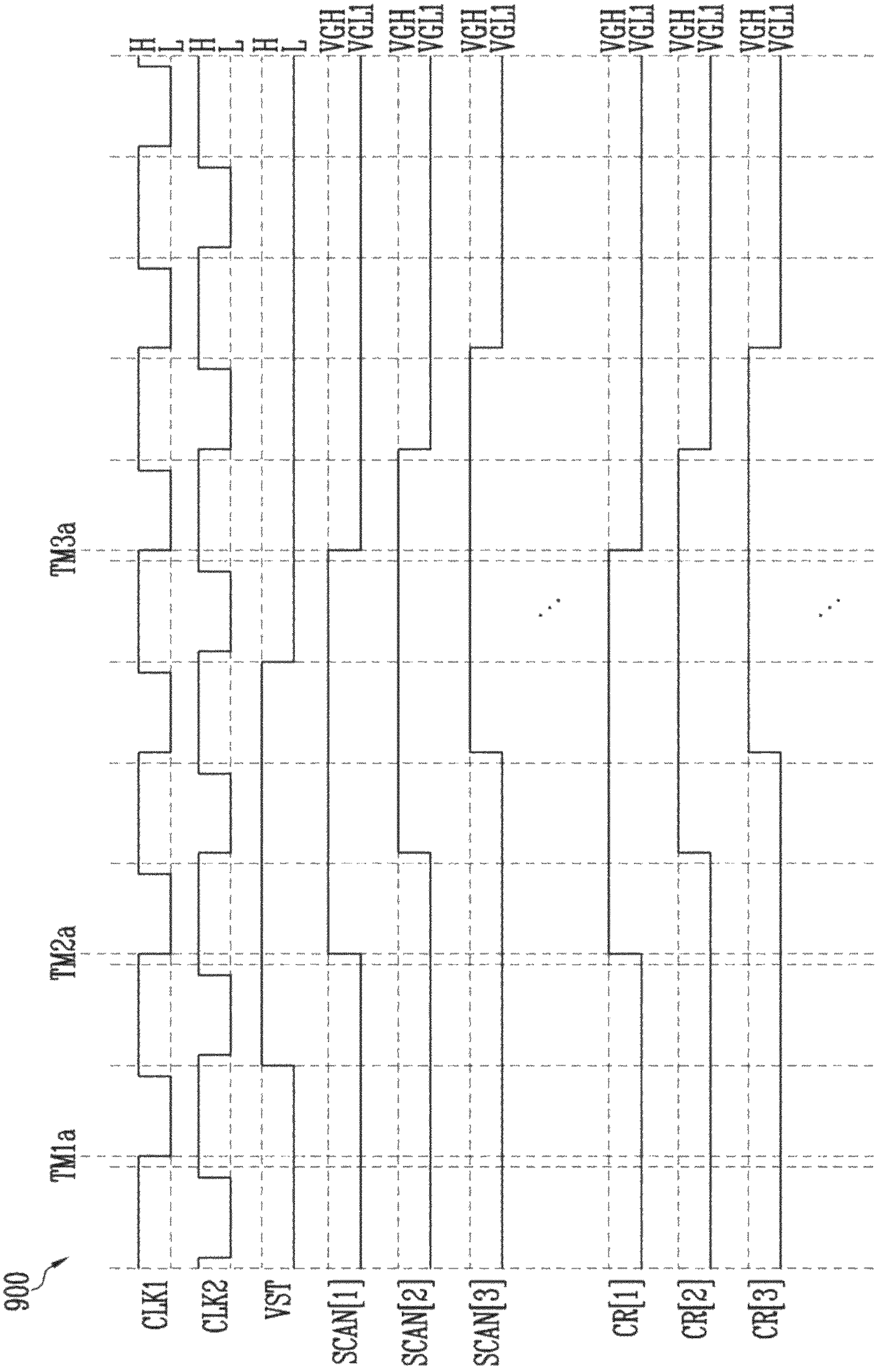
FIG. 9 is a timing diagram of a method of driving a scan driving circuit according to an embodiment.

FIG. 9 is a timing diagram of a method 900 of driving a scan driving circuit according to an embodiment.

The driving method 900 of the scan driving circuit according to embodiments of the present disclosure may be referred to as a driving method 900, a driving method 900 of a display device, or a driving method 900 for an electronic device.

Compared to the driving method 800 shown in FIG. 8, the driving method 900 shown in FIG. 9 may have a longer period between the second time point TM2*a* and the third time point TM3*a*. The first time point TM1*a*, the second time point TM2*a*, and the third time point TM3*a* are defined in the same manner as in the embodiment of FIG. 8.

Referring to FIG. 9, in embodiments of the present disclosure, the first scan signal SCAN[1] and the second scan signal SCAN[2] may overlap during a period in which a signal of a high level voltage VGH is input. The first scan signal SCAN[1] and the third scan signal SCAN[3] may overlap during a period in which a signal of the high level voltage VGH is input.

Figure 10:
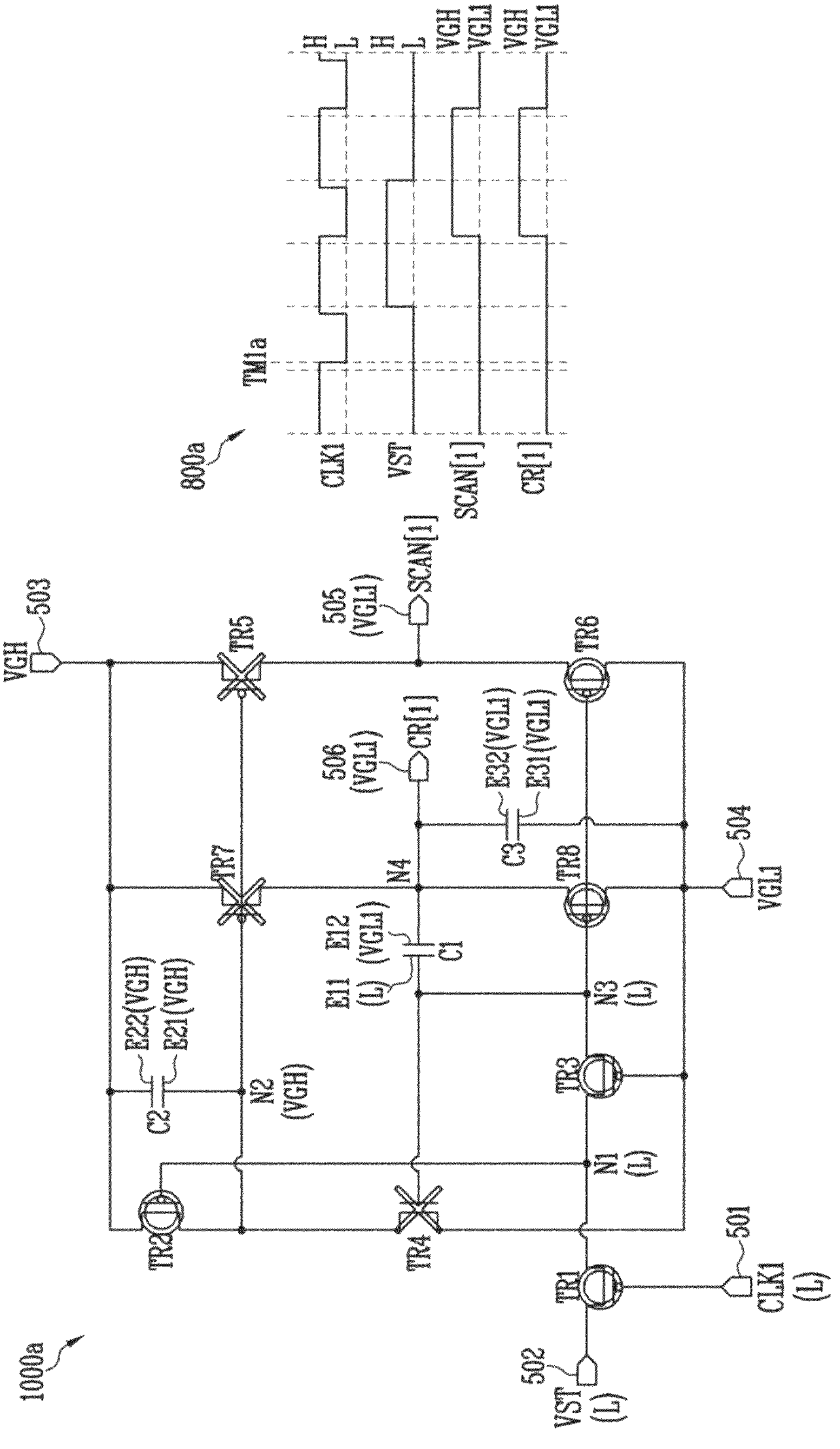
FIGS. 10 to 12 are diagrams illustrating the stage driving method of FIG. 8 focusing on the stage circuit of FIG. 5.
Figure 11:
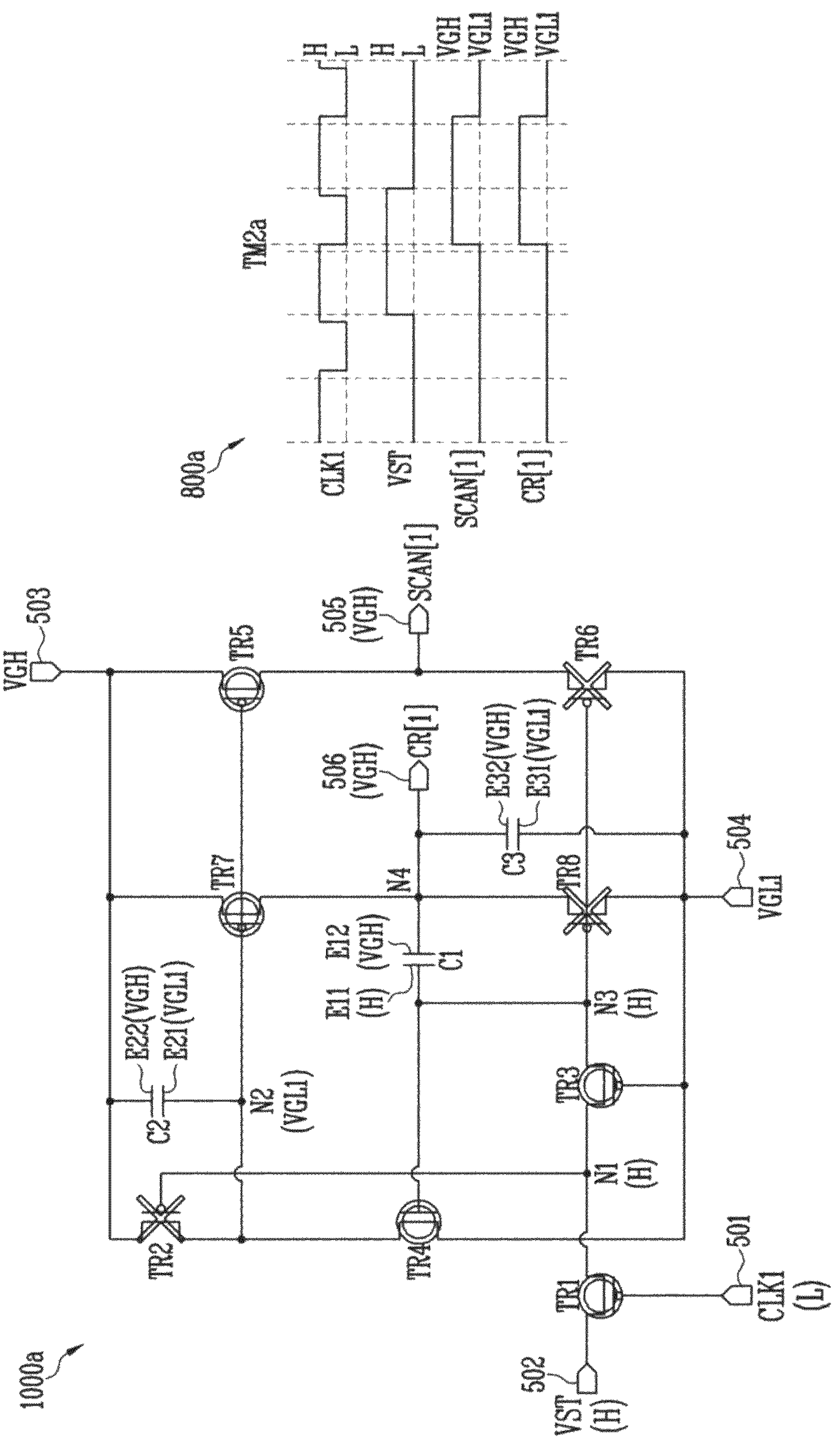
Figure 12:
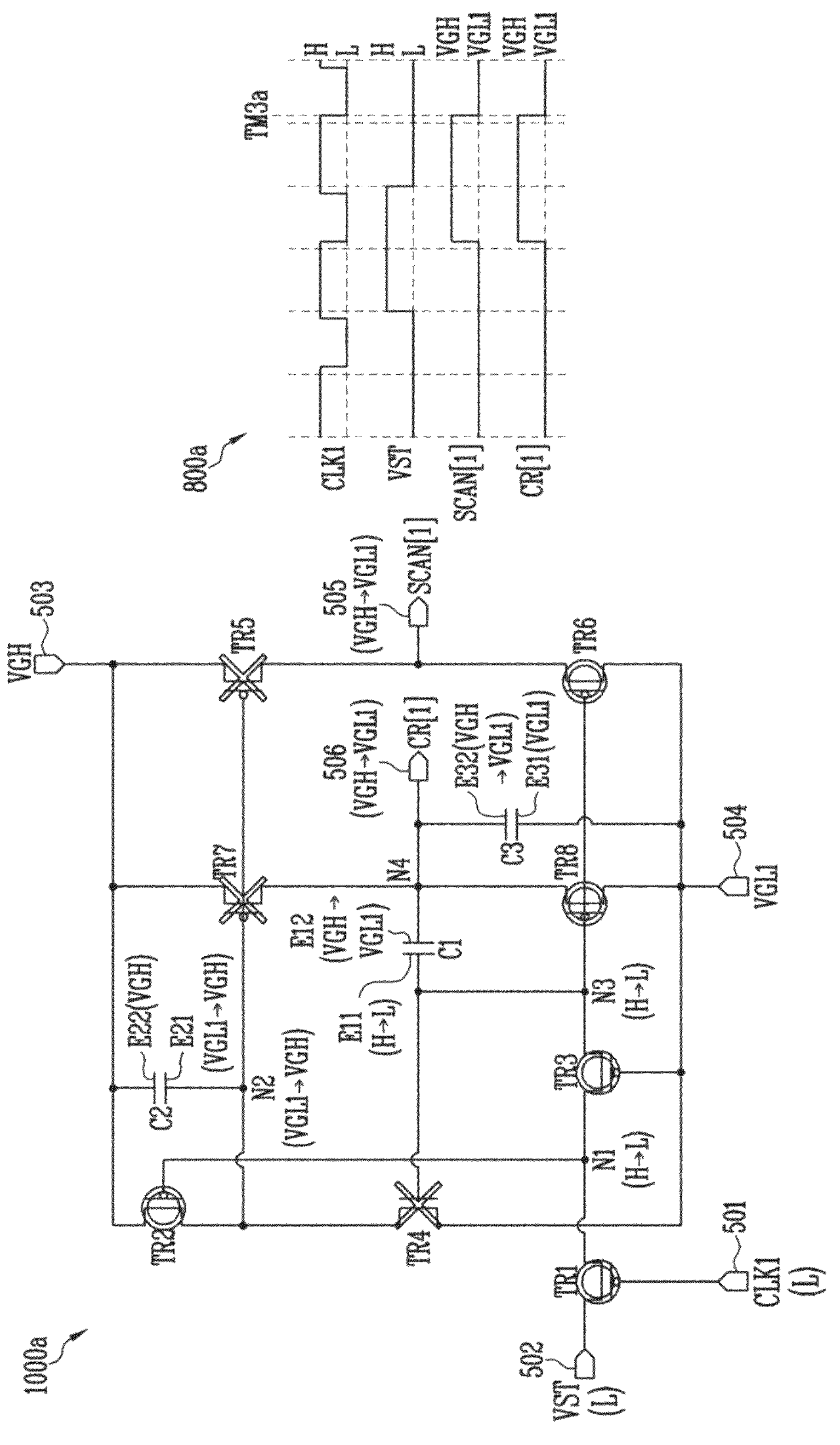

FIGS. 10 to 12 are diagrams illustrating the stage driving method 800 of FIG. 8, with a focus on the stage circuit of FIG. 5.

The stage circuit 1000*a* shown in FIGS. 10 to 12 may correspond to the first stage circuit ST1 of FIG. 4.

FIG. 10 shows the state of the stage circuit 1000*a* at a first time point TM1*a* (or a time point immediately after the first time point TM1*a*).

The first transistor TR1 may be turned on in response to the first clock signal CLK1 having a low level L. When the first transistor TR1 is turned on, a start signal VST having a low level L may be input to the first node N1.

The second transistor TR2 may be turned on when the first node N1 has a low level L. When the second transistor TR2 is turned on, a high level voltage VGH may be applied to the second node N2.

The third transistor TR3 may be turned on in response to the low level voltage VGL1. When the third transistor TR3 is turned on, the third node N3 is electrically connected to the first node N1, allowing the start signal VST of the low level L to be applied to both the first node N1 and the third node N3.

The fourth transistor TR4 may be turned off by a low level L applied to the third node N3.

The fifth transistor TR5 may be turned off with the second node N2 having a high level voltage VGH.

The sixth transistor TR6 may be turned on with the third node N3 having a low level L. When the sixth transistor TR6 is turned on, the first output terminal 505 may be electrically connected to the fourth input terminal 504, allowing the first scan signal SCAN[1] to assume the low level voltage VGL1.

The seventh transistor TR7 may be turned off with the second node N2 having a high level voltage VGH.

The eighth transistor TR8 may be turned on with the third node N3 having a low level L. When the eighth transistor TR8 is turned on, the fourth node N4 may be electrically connected with the fourth input terminal 504, allowing the first carry signal CR[1] to assume the low level voltage VGL1.

FIG. 11 shows the state of the stage circuit 1000*a* at the second time point TM2*a* (or a time point immediately after the second time point TM2A).

The first transistor TR1 may be turned on in response to the first clock signal CLK1 at the low level L. When the first transistor TR1 is turned on, a start signal VST having a high level H may be input to the first node N1.

The second transistor TR2 may be turned off when the first node N1 has a high level H. When the second transistor TR2 is turned off, the second node N2 may be electrically insulated from the third input terminal 503. The third transistor TR3 may be turned on in response to the low node N3 is electrically connected to the first node N1, and a high level H start signal VST may be input.

The fourth transistor TR4 may be turned on when the third node N3 has the high level H. When the fourth transistor TR4 is turned on, the second node N2 may be electrically connected to the fourth input terminal 504. A low level voltage VGL1 may be applied to the second node N2.

The fifth transistor TR5 may be turned on when the second node N2 has the low level voltage VGL1. When the fifth transistor TR5 is turned on, the first output terminal 505 may be electrically connected to the third input terminal 503. The first scan signal SCAN[1] may have a high level voltage VGH.

The sixth transistor TR6 may be turned off when the third node N3 has the high level H. When the sixth transistor TR6 is turned off, the first output terminal 505 may be electrically insulated from the fourth input terminal 504.

The seventh transistor TR7 may be turned on when the second node N2 has the low level voltage VGL1. When the seventh transistor TR7 is turned on, the third input terminal 503 may be electrically connected to the fourth node N4. A high level voltage VGH may be applied to the fourth node N4. The first carry signal CR[1] may have a high level voltage VGH.

The eighth transistor TR8 may be turned off when the third node N3 has the high level H. When the eighth transistor TR8 is turned off, the fourth node N4 may be electrically insulated from the fourth input terminal 504.

As a result, the first scan signal SCAN[1] and the first carry signal CR[1] may rise from the low level voltage VGL1 to the high level voltage VGH.

FIG. 12 shows the state of the stage circuit 1000*a* at a third point in time TM3*a* (or a point in time immediately after the third point in time TM3*a*).

The first transistor TR1 may be turned on in response to the first clock signal CLK1 at the low level L. When the first transistor TR1 is turned on, a start signal VST having a low level L may be input to the first node N1. The voltage of the first node N1 may drop from the high level H to the low level L.

The second transistor TR2 may be turned on when the first node N1 has a low level L. When the second transistor TR2 is turned on, a high level voltage VGH may be applied to the second node N2. The voltage of the second node N2 may rise from the low level voltage VGL1 to the high level voltage VGH.

The third transistor TR3 may be turned on in response to the low level voltage VGL1. When the third transistor TR3 is turned on, the third node N3 becomes electrically connected to the first node N1, allowing the start signal VST at the low level L to be input. The voltage of the third node N3 may drop from the high level H to the low level L.

The fourth transistor TR4 may be turned off when the third node N3 has the low level L. The electrical connection between the second node N2 and the fourth input terminal 504 may be insulated when the fourth transistor TR4 is turned off.

The fifth transistor TR5 may be turned off when the second node N2 has a high level voltage VGH. The electrical connection between the first output terminal 505 and the third input terminal 503 may be insulated when the fifth transistor TR5 is turned off.

The sixth transistor TR6 may be turned on when the third node N3 has a low level L. When the sixth transistor TR6 is turned on, the first output terminal 505 may be electrically connected to the fourth input terminal 504, allowing the first scan signal SCAN[1] to have the low level voltage VGL1.

The seventh transistor TR7 may be turned off when the second node N2 has a high level voltage VGH. The electrical connection between the second output terminal 506 and the third input terminal 503 may be insulated when the seventh transistor TR7 is turned off.

The eighth transistor TR8 may be turned on when the third node N3 has a low level L. When the eighth transistor TR8 is turned on, the fourth node N4 may be electrically connected with the fourth input terminal 504, allowing the first carry signal CR[1] to have the low level voltage VGL1.

As a result, the first scan signal SCAN[1] and the first carry signal CR[1] may be reduced from the high level voltage VGH to the low level voltage VGL1.

Meanwhile, the voltage of the second electrode E32 of the third capacitor C3 drops from the high level voltage VGH to the low level voltage VGL1 at the third time point TM3*a*. Embodiments of the present disclosure may enable a rapid reduction in the voltage of the fourth node N4 by using a relative small capacitance for the third capacitor C3. This makes it possible to lower the voltage of the first carry signal CR[1] faster.

Figure 13:
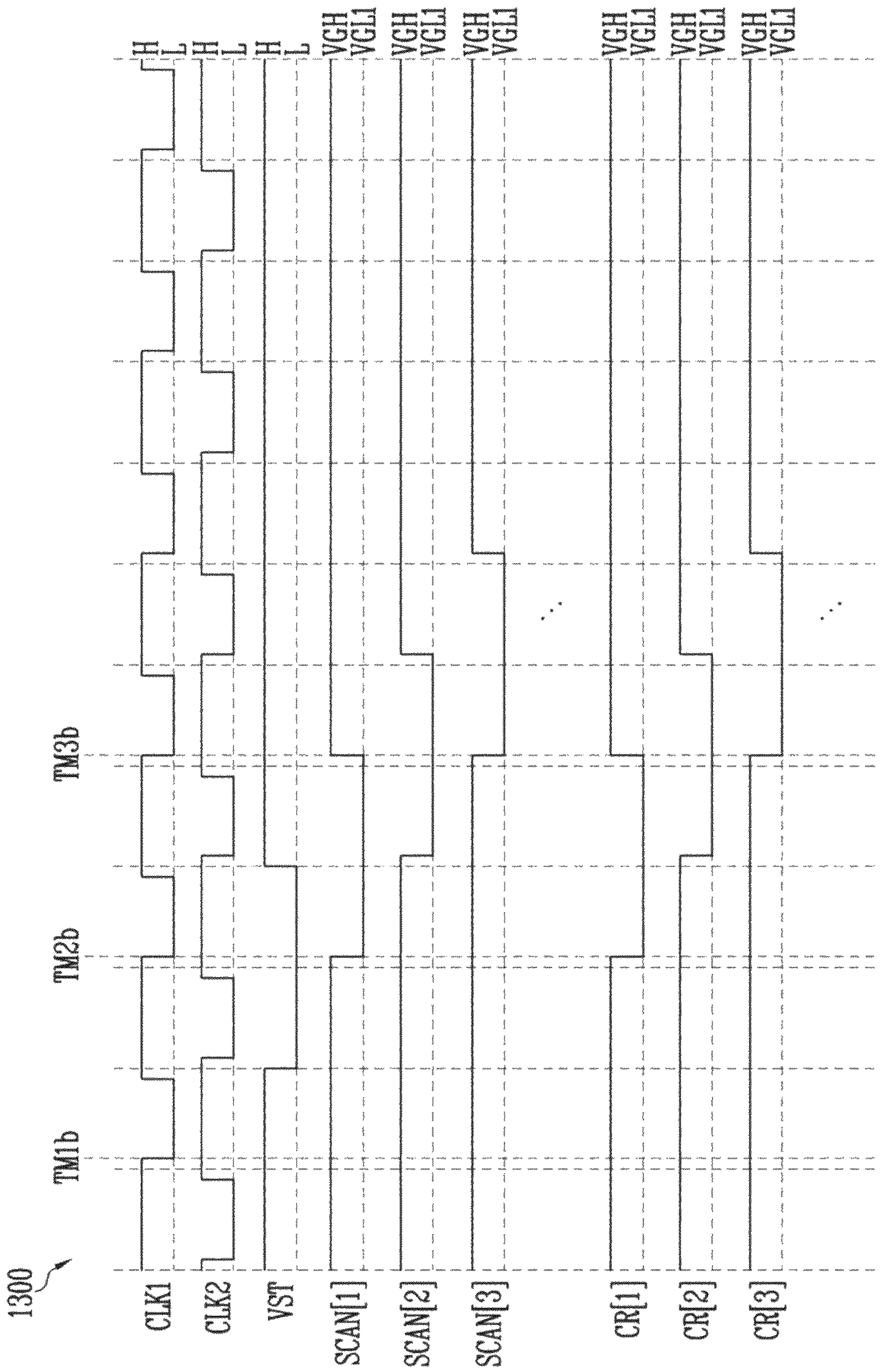
FIG. 13 is a timing diagram of a method of driving a scan driving circuit according to an embodiment.

FIG. 13 is a timing diagram of a method 1300 of driving a scan driving circuit according to an embodiment.

The driving method 1300 of the scan driving circuit according to embodiments of the present disclosure may be referred to as a driving method 1300, a driving method 1300 of the display device, or a driving method 1300 of an electronic device.

Referring to FIG. 13, a first clock signal CLK1, a second clock signal CLK2, and a start signal VST input to the scan driving circuit 130 (see FIG. 4) are shown. Then, the scan signals SCAN[1], SCAN[2], SCAN[3], . . . generated by the first clock signal CLK1, the second clock signal CLK2, and the start signal VST, and the carry signals CR[1], CR[2], CR[3], . . . are shown.

Based on the first scan signal SCAN[1] and the first carry signal CR[1], a first time point TM1*b* (e.g., a first-b time point TM1*b*), a second time point TM2*b* (e.g., a second-b time point TM2*b*), and a third time point TM3*b* (e.g., a third-b time point TM3*b*) are described.

At a first time point TM1*b*, the first clock signal CLK1 transitions from the high level H to the low level L, and the start signal VST may have the high level H. At a first time point TM1*b*, the first scan signal SCAN[1] may have a high level voltage VGH. At a first time point TM1*b*, the first carry signal CR[1] may have a high level voltage VGH.

At the second time point TM2*b*, the first clock signal CLK1 transitions from the high level H to the low level L, and the start signal VST may have the low level L. At the second time point TM2*b*, the first scan signal SCAN[1] may drop from the high level voltage VGH to the low level voltage VGL1. At the second time point TM2*b*, the first carry signal CR[1] may drop from the high level voltage VGH to the low level voltage VGL1.

At the third time point TM3*b*, the first clock signal CLK1 transitions from the high level H to the low level L, and the start signal VST may have the high level H. At a third time point TM3*b*, the first scan signal SCAN[1] may rise from the low level voltage VGL1 to the high level voltage VGH. At a third time point TM3*b*, the first carry signal CR[1] may rise from the low level voltage VGL1 to the high level voltage VGH.

Referring to FIG. 13, in embodiments of the present disclosure, the first scan signal SCAN[1] and the second scan signal SCAN[2] may overlap during a period in which a signal of the low level voltage VGL1 is input. The period during which the signal of the low level voltage VGL1 is input may not overlap between the first scan signal SCAN[1] and the third scan signal SCAN[3].

Figure 14:
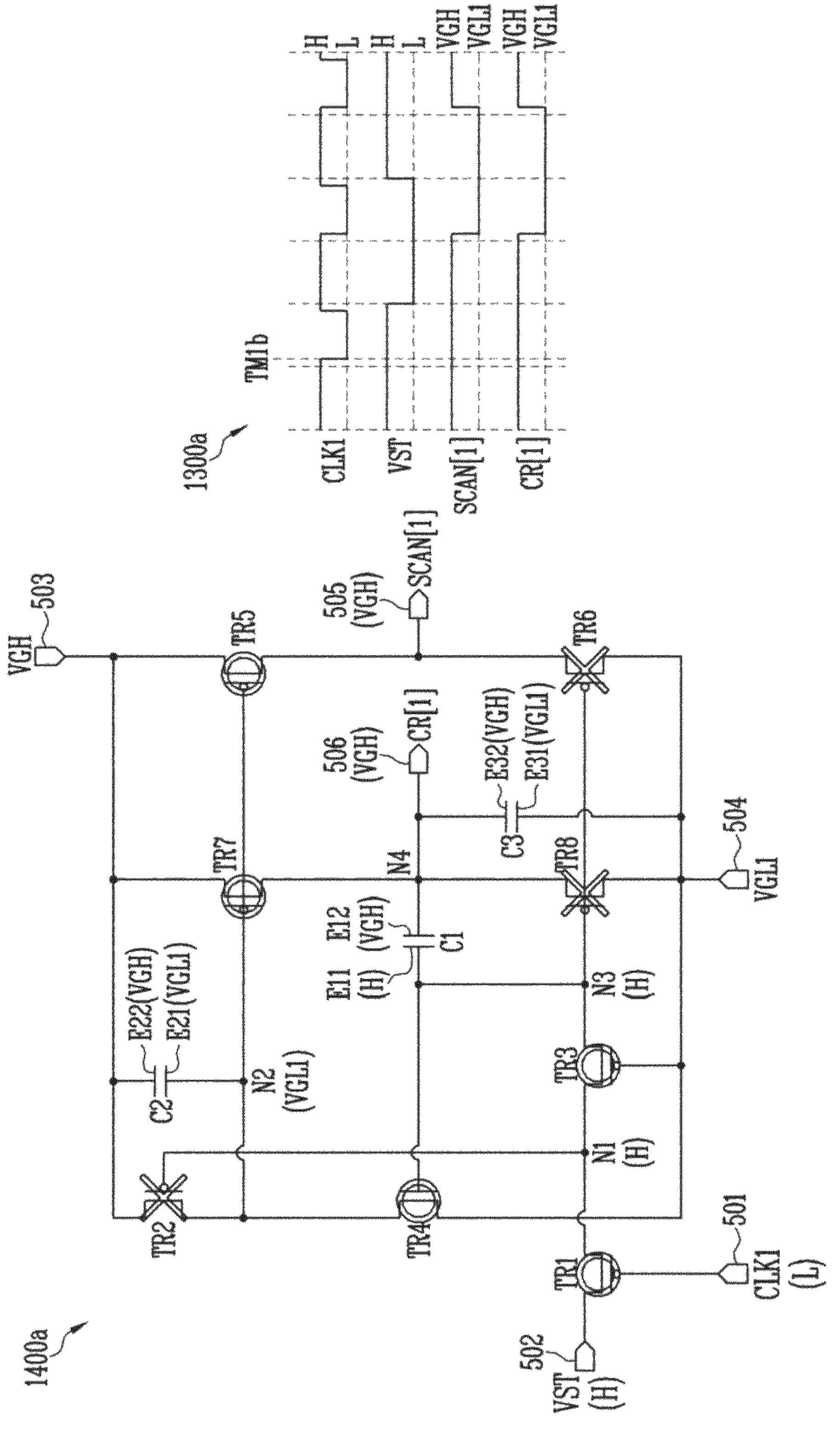
FIGS. 14 to 16 are diagrams illustrating the stage driving method of FIG. 13 focusing on the stage circuit of FIG. 5.
Figure 15:
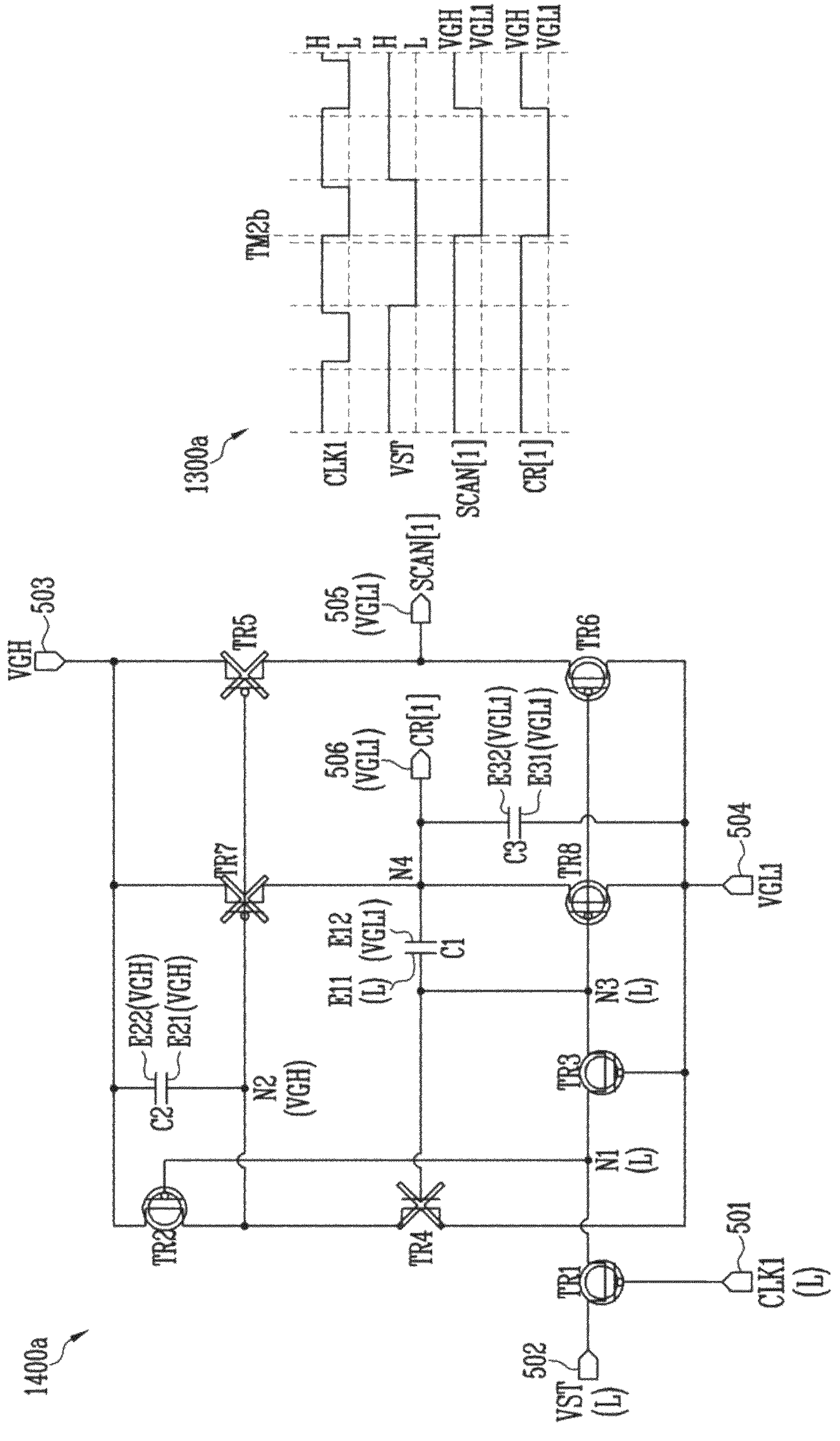
Figure 16:
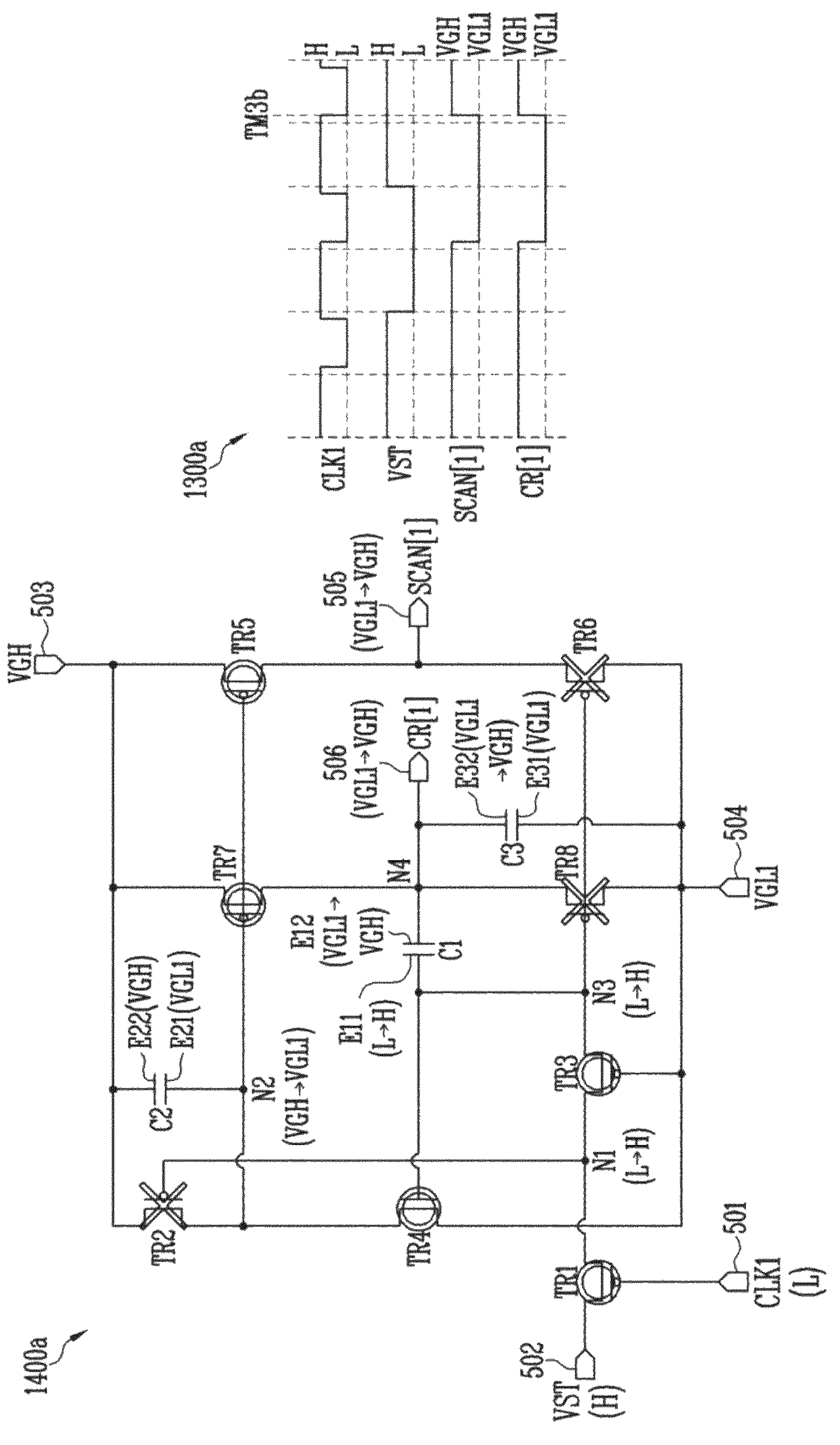

FIGS. 14 to 16 are diagrams illustrating the stage driving method 1300*a* of FIG. 13 with the stage circuit of FIG. 5 as a center.

The stage circuit 1400*a* shown in FIGS. 14 to 16 may correspond to the first stage circuit ST1 of FIG. 4.

FIG. 14 shows the state of the stage circuit 1400*a* at a first time point TM1*b* (or a time point immediately after the first time point TM1*b*). The first transistor TR1 may be turned on in response to the first clock signal CLK1 at the low level L. When the first transistor TR1 is turned on, a start signal VST having a low level L may be input to the first node N1.

The second transistor TR2 may be turned off when the first node N1 has a high level H. When the second transistor TR2 is turned off, the second node N2 and the third input terminal 503 may be electrically insulated from each other.

The third transistor TR3 may be turned on in response to the low level voltage VGL1. When the third transistor TR3 is turned on, the third node N3 is electrically connected to the first node N1, and a high level H start signal VST may be input to the first node N1 and the third node N3, respectively.

The fourth transistor TR4 may be turned on in response to a signal having a high level H applied to the third node N3. The second node N2 is electrically connected to the fourth input terminal 504, and a low level voltage VGL1 may be applied to the second node N2.

The fifth transistor TR5 may be turned on in response to the low level voltage VGL1 applied to the second node N2.

The sixth transistor TR6 may be turned off with the third node N3 having the high level H. When the sixth transistor TR6 is turned off, the first output terminal 505 may be electrically insulated from the fourth input terminal 504.

The seventh transistor TR7 may be turned on with the second node N2 having the low level voltage VGL1.

The eighth transistor TR8 may be turned off with the third node N3 having the high level H. When the eighth transistor TR8 is turned off, the fourth node N4 may be electrically insulated from the fourth input terminal 504.

FIG. 15 illustrates the state of the stage circuit 1400*a* at a second time point TM2*b* (or a time point immediately after the second time point TM2*b*).

The first transistor TR1 may be turned on in response to the first clock signal CLK1 having a low level L. When the first transistor TR1 is turned on, a start signal VST having a low level L may be input to the first node N1.

The second transistor TR2 may be turned on when the first node N1 has a low level L. When the second transistor TR2 is turned on, the second node N2 is electrically connected to the third input terminal 503, and a high level voltage VGH may be applied to the second node N3.

The third transistor TR3 may be turned on in response to the low level voltage VGL1. When the third transistor TR3 is turned on, the third node N3 becomes electrically connected to the first node N1, allowing the start signal VST of the low level L to be applied to both the first node N1 and the third node N3.

The fourth transistor TR4 may be turned on when the third node N3 has the high level H. When the fourth transistor TR4 is turned on, the second node N2 may be electrically connected to the fourth input terminal 504. A low level voltage VGL1 may be applied to the second node N2.

The fifth transistor TR5 may be turned off when the second node N2 has a high level voltage VGH. When the fifth transistor TR5 is turned off, the first output terminal 505 may be electrically insulated from the third input terminal 503.

The sixth transistor TR6 may be turned on when the third node N3 has a low level L. When the sixth transistor TR6 is turned on, the first output terminal 505 may be electrically connected to the fourth input terminal 504. The first scan signal SCAN[1] may have a low level voltage VGL1.

The seventh transistor TR7 may be turned off when the second node N2 has a high level voltage VGH. When the seventh transistor TR7 is turned off, the third input terminal 503 may be electrically insulated from the fourth node N4.

The eighth transistor TR8 may be turned on when the third node N3 has a low level L. When the eighth transistor TR8 is turned on, the fourth node N4 may be electrically connected to the fourth input terminal 504. The first carry signal CR[1] may have a low level voltage VGL1.

As a result, the first scan signal SCAN[1] and the first carry signal CR[1] may be lowered from the high level voltage VGH to the low level voltage VGL1.

Meanwhile, at the second time point TM2*b*, the voltage of the second electrode E32 of the third capacitor C3 drops from the high level voltage VGH to the low level voltage VGL1. Embodiments of the present disclosure may achieve faster voltage reduction at the fourth node N4 by configuring the third capacitor C3 with a relatively small capacitance. This makes it possible to lower the voltage of the first carry signal CR[1] faster.

FIG. 16 illustrates the state of the stage circuit 1400*a* at a third time point TM3*b* (or a time point immediately after the third time point TM3*b*).

The first transistor TR1 may be turned on in response to the first clock signal CLK1 at the low level L. When the first transistor TR1 is turned on, a start signal VST having a high level H may be input to the first node N1. The voltage of the first node N1 may rise from the low level L to the high level H.

The second transistor TR2 may be turned off when the first node N1 has a high level H. When the second transistor TR2 is turned off, the second node N2 and the third input terminal 503 may be electrically insulated.

The third transistor TR3 may be turned on in response to the low level voltage VGL1. When the third transistor TR3 is turned on, the third node N3 becomes electrically connected to the first node N1, the start signal VST of the high level H to be input. The voltage of the third node N3 may rise from the low level L to the high level H.

The fourth transistor TR4 may be turned on when the third node N3 has the high level H. When the fourth transistor TR4 is turned on, the second node N2 and the fourth input terminal 504 may be electrically connected. The voltage of the second node N2 may drop from the high level voltage VGH to the low level voltage VGL1.

The fifth transistor TR5 may be turned on when the second node N2 has the low level voltage VGL1. When the fifth transistor TR5 is turned on, the first output terminal 505 may be electrically connected to the third input terminal 503. The first scan signal SCAN[1] may rise from the low level voltage VGL1 to the high level voltage VGH.

The sixth transistor TR6 may be turned off when the third node N3 has the high level H. When the sixth transistor TR6 is turned off, the first output terminal 505 may be electrically insulated from the fourth input terminal 504.

The seventh transistor TR7 may be turned on when the second node N2 has the low level voltage VGL1. When the seventh transistor TR7 is turned on, the second output terminal 506 may be electrically connected to the third input terminal 503. The first carry signal CR[1] may rise from the low level voltage VGL1 to the high level voltage VGH.

The eighth transistor TR8 may be turned off when the third node N3 has the high level H. When the eighth transistor TR8 is turned off, the fourth node N4 may be electrically insulated from the fourth input terminal 504.

As a result, the first scan signal SCAN[1] and the first carry signal CR[1] may rise from the low level voltage VGL1 to the high level voltage VGH.

Figure 17:
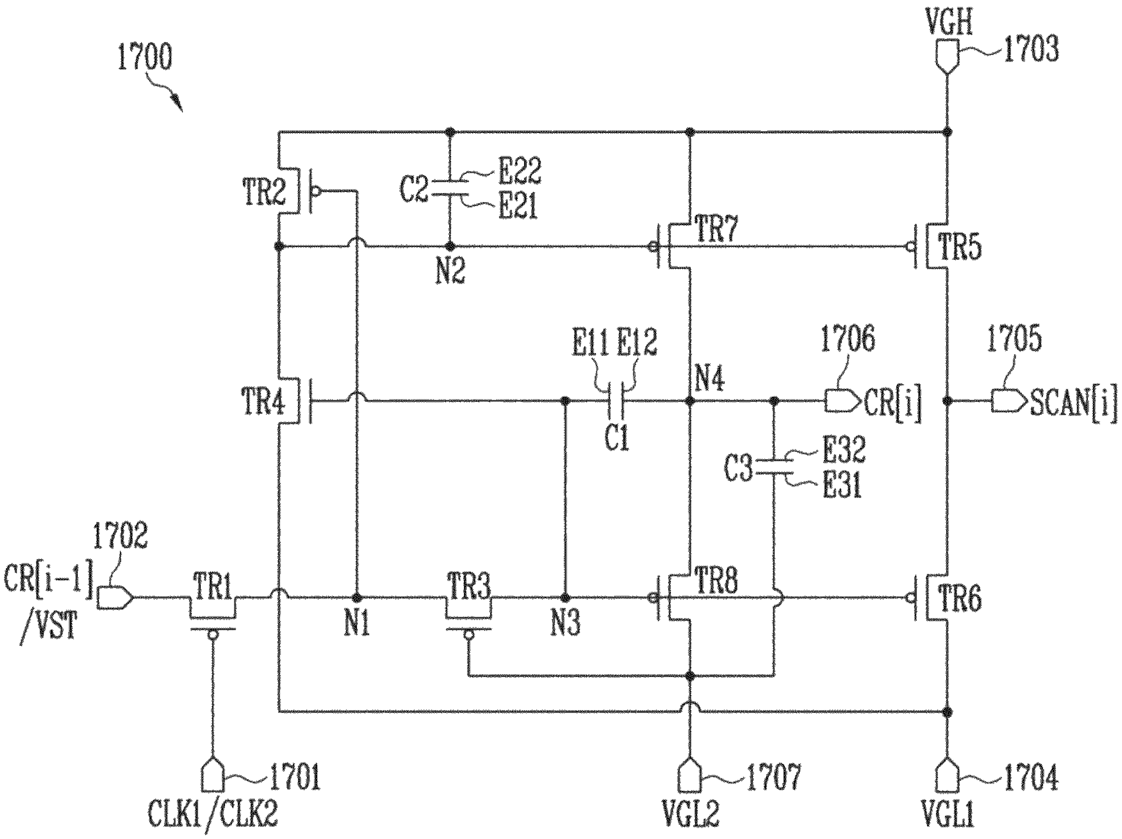
FIG. 17 is an equivalent circuit diagram of a stage circuit according to an embodiment.

FIG. 17 is an equivalent circuit diagram of a stage circuit 1700 according to an embodiment.

The stage circuit 1700 of FIG. 17 may correspond to any one of the first to n-th stage circuits ST1 to STn of FIG. 4.

Referring to FIG. 17, a stage circuit 1700 according to embodiments of the present disclosure may include one or more input terminals, one or more output terminals, one of more switching elements, and one or more storage elements.

In one embodiment, the switching element may be implemented as a transistor. In one embodiment, the storage element may function as a capacitor.

In one embodiment, the stage circuit 1700 according to embodiments of the present disclosure may include eight transistors and three capacitors. However, embodiments of the present disclosure are not limited thereto.

The stage circuit 1700 according to an embodiment of the present disclosure may include a first input terminal 1701, a second input terminal 1702, a third input terminal 1703, a fourth input terminal 1704, and a seventh input terminal 1707. The stage circuit 1700 may include a first output terminal 1705 and a second output terminal 1706. The stage circuit 1700 may include first to eighth transistors TR1 to TR8. The stage circuit 1700 may include first to third capacitors C1 to C3.

Any one of the first clock signal CLK1 and the second clock signal CLK2 may be input to the first input terminal 1701.

Any one of the start signal VST and the (i−1)-th carry signal CR[i−1] may be input to the second input terminal 1702.

A high level voltage VGH may be input to the third input terminal 1703.

A low level voltage VGL1 (e.g., a first low level voltage VGL1) may be input to the fourth input terminal 1704.

A low level voltage VGL2 (e.g., a second low level voltage VGL2) may be input to the seventh input terminal 1707.

A scan signal SCAN[i] may be output to the first output terminal 1705.

An i-th carry signal CR[i] may be output to the second output terminal 1706.

The first transistor TR1 may include a gate electrode electrically connected to the first input terminal 1701. The first transistor TR1 may be configured to switch or control an electrical connection between the second input terminal 1702 and the first node N1 in response to a signal input to the first input terminal 1701. When the first transistor TR1 is turned on, a start signal VST or an (i−1)-th carry signal CR[i−1] may be input to the first node N1.

The second transistor TR2 may include a gate electrode electrically connected to the first node N1. The second transistor TR2 may be configured to switch or an electrical connection between the third input terminal 1703 and the second node N2. When the second transistor TR2 is turned on, a high level voltage VGH may be input to the second node N2.

The third transistor TR3 may include a gate electrode electrically connected to the seventh input terminal 1707. When the third transistor TR3 is turned on, the first node N1 and the third node N3 may be electrically connected.

The fourth transistor TR4 may include a gate electrode electrically connected to the third node N3. The fourth transistor TR4 may be configured to switch or control an electrical connection between the fourth input terminal 1704 and the second node N2. When the fourth transistor TR4 is turned on, the low level voltage VGL1 may be input to the second node N2.

The fifth transistor TR5 may include a gate electrode electrically connected to the second node N2. The fifth transistor TR5 may be configured to switch or control an electrical connection between the third input terminal 1703 and the first output terminal 1705. When the fifth transistor TR5 is turned on, a high level voltage VGH may be input to the first output terminal 1705. In embodiments of the present disclosure, the second node N2 may be referred to as a QB node. In an embodiment, a voltage of the QB node is complementary to the voltage of the Q node.

The sixth transistor TR6 may include a gate electrode electrically connected to the third node N3. The sixth transistor TR6 may be configured to switch an electrical connection between the fourth input terminal 1704 and the first output terminal 1705. When the sixth transistor TR6 is turned on, the low level voltage VGL1 may be input to the first output terminal 1705. In embodiments of the present disclosure, the third node N3 may be referred to as a Q node.

The seventh transistor TR7 may include a gate electrode electrically connected to the second node N2. The seventh transistor TR7 may be configured to switch an electrical connection between the third input terminal 1703 and the fourth node N4. When the seventh transistor TR7 is turned on, a high level voltage VGH may be input to the fourth node N4.

The eighth transistor TR8 may include a gate electrode electrically connected to the third node N3. The eighth transistor TR8 may be configured to switch or control an electrical connection between the seventh input terminal 1707 and the fourth node N4. When the eighth transistor TR8 is turned on, a low level voltage VGL2 may be input to the fourth node N4.

In an embodiment, at least one of the first to eighth transistors TR1 to TR8 may be implemented as a transistor including a P-type semiconductor. In an embodiment, at least one of the first to eighth transistors TR1 to TR8 may be implemented as a transistor including an N-type semiconductor.

Referring to FIG. 5, the first to third transistors TR1 to TR3 and the fifth to eighth transistors TR5 to TR8 may be implemented as transistors including a P-type semiconductor. The fourth transistor TR4 may be implemented as a transistor including an N-type semiconductor. However, embodiments of the present disclosure are not limited thereto.

The first capacitor C1 may be configured to maintain a potential difference between the third node N3 and the fourth node N4. The first capacitor C1 may include a first electrode E11 electrically connected to the third node N3 and a second electrode E12 electrically connected to the fourth node N4. The first capacitor C1 may function to lower or raise the voltage at the third node N3, thereby simultaneously lowering or raising the voltage at the fourth node N4. The first capacitor C1 may be referred to as, or function as, a boosting capacitor.

The second capacitor C2 may be configured to maintain a voltage applied to the second node N2. In an embodiment, the second capacitor C2 may include a first electrode E21 electrically connected with the second node N2 and a second electrode E22 electrically connected with the third input terminal 503. The second capacitor C2 may help prevent ripple voltage at the second mode N2 from adversely affecting the operation of other transistors (e.g., the fifth transistor TR5 and the seventh transistor TR7). The second capacitor C2 may be referred to as, or function as, a stabilizing capacitor.

The third capacitor C3 may be configured to maintain a voltage applied to the fourth node N4. In an embodiment, the third capacitor C3 may include a first electrode E31 electrically connected with the seventh input terminal 1707 and a second electrode E32 electrically connected with the fourth node N4. The third capacitor C3 is discharged in the process of lowering the voltage of the fourth node N4, so that the level of the voltage output from the second output terminal 1706 may be effectively lowered.

The third capacitor C3 may be referred to as, or function as, a buffer capacitor.

In the third capacitor C3 according to embodiments of the present disclosure, the second electrode E32 is not connected to the first output terminal 1705, but may be connected to the second output terminal 1706. In embodiments of the present disclosure, the third capacitor C3 may have a smaller capacitance compared to an example in which the second electrode E32 of the third capacitor C3 is connected to the first output terminal 1705. Accordingly, the voltage of the fourth node N4 may be lowered more quickly. Meanwhile, in embodiments of the present disclosure, the low level voltage VGL2 (e.g., the second low level voltage VGL2) applied to the seventh input terminal 1707 may be lower than the low level voltage VGL1 (e.g., the first low level voltage VGL1) applied to the fourth input terminal 1704. Compared to the embodiment of FIG. 5, the constant voltage applied to the first electrode E31 of the third capacitor C3 is set to a lower level, enabling more effective discharge of the third capacitor C3 when the i-th carry signal CR[i] transitions from the high level to the low level. As a result, the length of the period during which the i-th carry signal CR[i] transitions from the high level to the low level may be further reduced.

Figure 18:
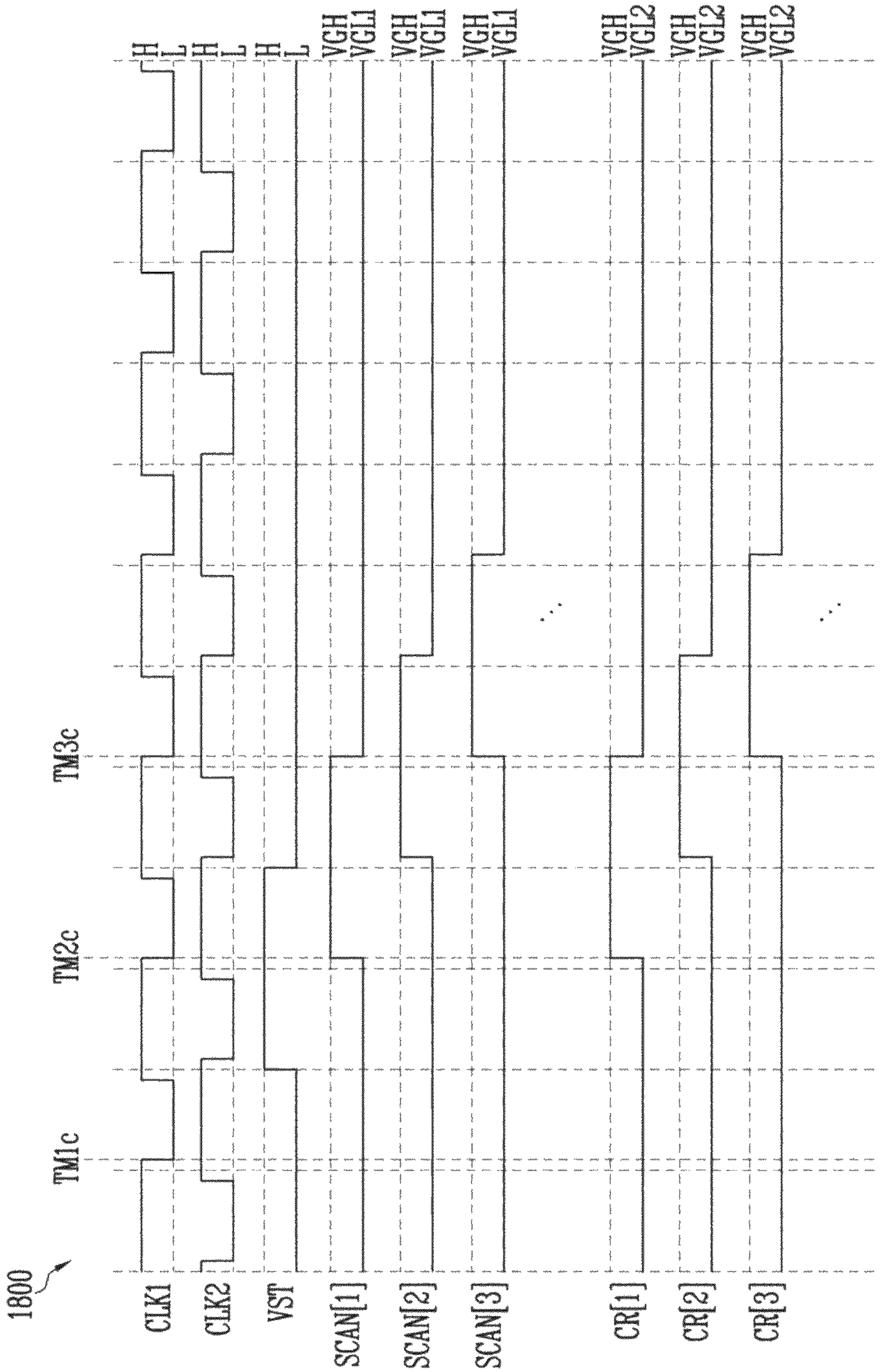
FIG. 18 is a timing diagram of a method of driving a scan circuit according to an embodiment.

FIG. 18 is a timing diagram of a method 1800 of driving a scan circuit according to an embodiment.

The driving method 1800 of the scan driving circuit according to embodiments of the present disclosure may be referred to as a driving method 1800, a driving method 1800 of the display device or a driving method 1800 of the electronic device.

Referring to FIG. 18, a first clock signal CLK1, a second clock signal CLK2, and a start signal VST input to the scan driving circuit 130 (see FIG. 4) are shown. The scan signals SCAN[1], SCAN[2], SCAN[3], . . . generated by the first clock signal CLK1, the second clock signal CLK2, and the start signal VST, and the carry signals CR[1], CR[2], CR[3], . . . are shown.

Based on the first scan signal SCAN[1] and the first carry signal CR[1], a first time point TM1*c* (e.g., the first-c time point TM1*c*), a second-c time point TM2*c* (e.g., the second time point TM2*c*), and a third time point TM3*c* (e.g., the third-c time point TM3*c*) are described.

At a first time point TM1*c*, the first clock signal CLK1 transitions from the high level H to the low level L, and the start signal VST may have the low level L. At a first time point TM1*c*, the first scan signal SCAN[1] may have a low level voltage VGL1. At a first time point TM1*c*, the first carry signal CR[1] may have a low level voltage VGL2.

At the second time point TM2*c*, the first clock signal CLK1 transitions from the high level H to the low level L, and the start signal VST may have the high level H. At a second time point TM2*c*, the first scan signal SCAN[1] may rise from the low level voltage VGL1 to the high level voltage VGH. At a second time point TM2*c*, the first carry signal CR[1] may rise from the low level voltage VGL2 to the high level voltage VGH.

At the third time point TM3*c*, the first clock signal CLK1 transitions from the high level H to the low level L, and the start signal VST may have the low level L. At a third time point TM3*c*, the first scan signal SCAN[1] may drop from the high level voltage VGH to the low level voltage VGL1. At a third time point TM3*c*, the first carry signal CR[1] may drop from the high level voltage VGH to the low level voltage VGL2.

Referring to FIG. 18, in embodiments of the present disclosure, the first scan signal SCAN[1] and the second scan signal SCAN[2] may overlap during a period in which a signal of a high level voltage VGH is input. The first scan signal SCAN[1] and the third scan signal SCAN[3] may not overlap during the period in which the signal of the high level voltage VGH is input. However, embodiments of the present disclosure are not limited thereto. For example, with reference to the embodiment of FIG. 9, since the length of the period between the second time point TM2*c* and the third time point TM3*c* differ, the period during which the signal of the high level voltage VGH is input to the first scan signal SCAN[1] and the third scan signal SCAN[3] may overlap.

Figure 19:
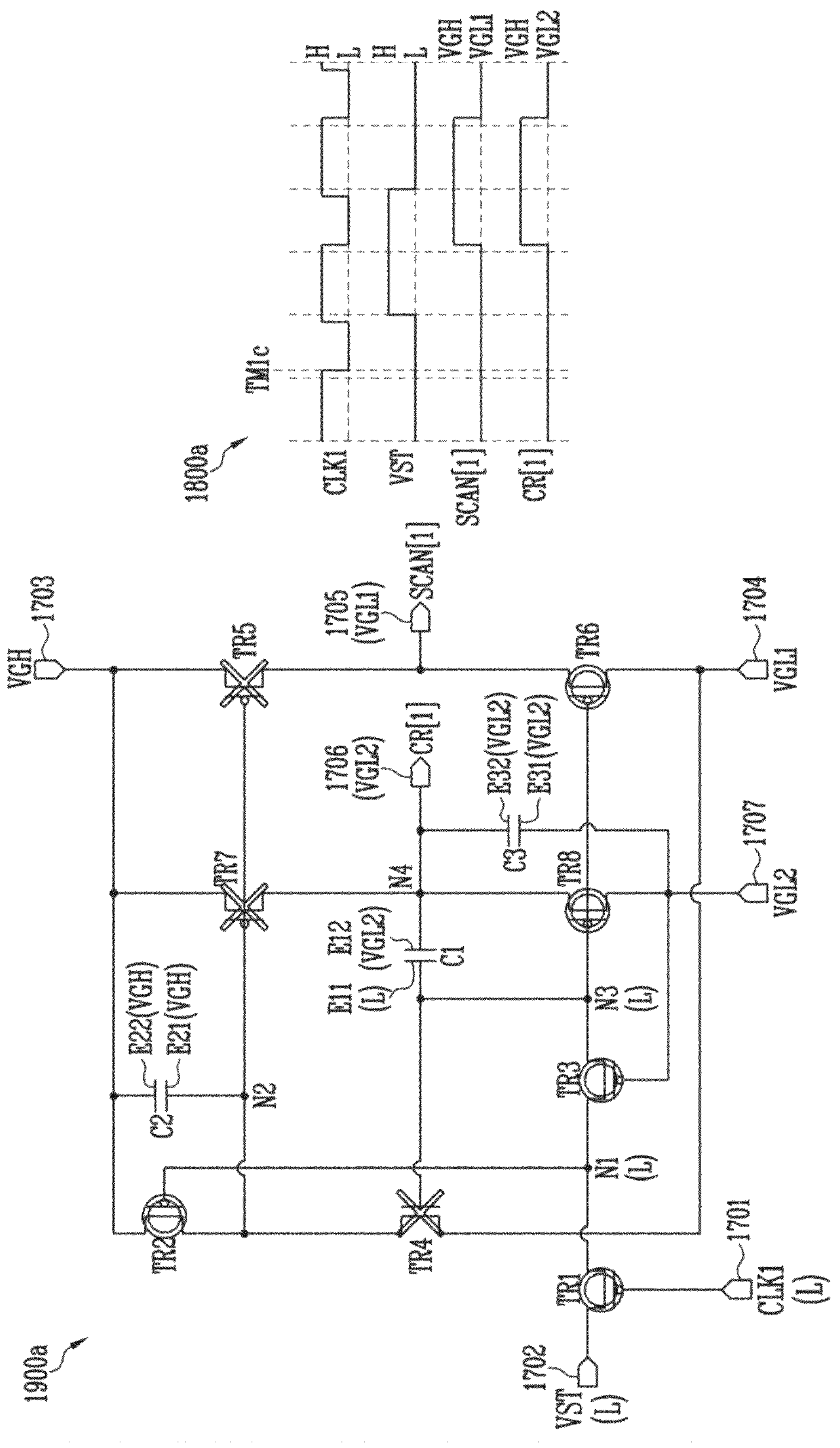
FIGS. 19 to 21 are diagrams illustrating the stage driving method of FIG. 18 focusing on the stage circuit of FIG. 17.
Figure 20:
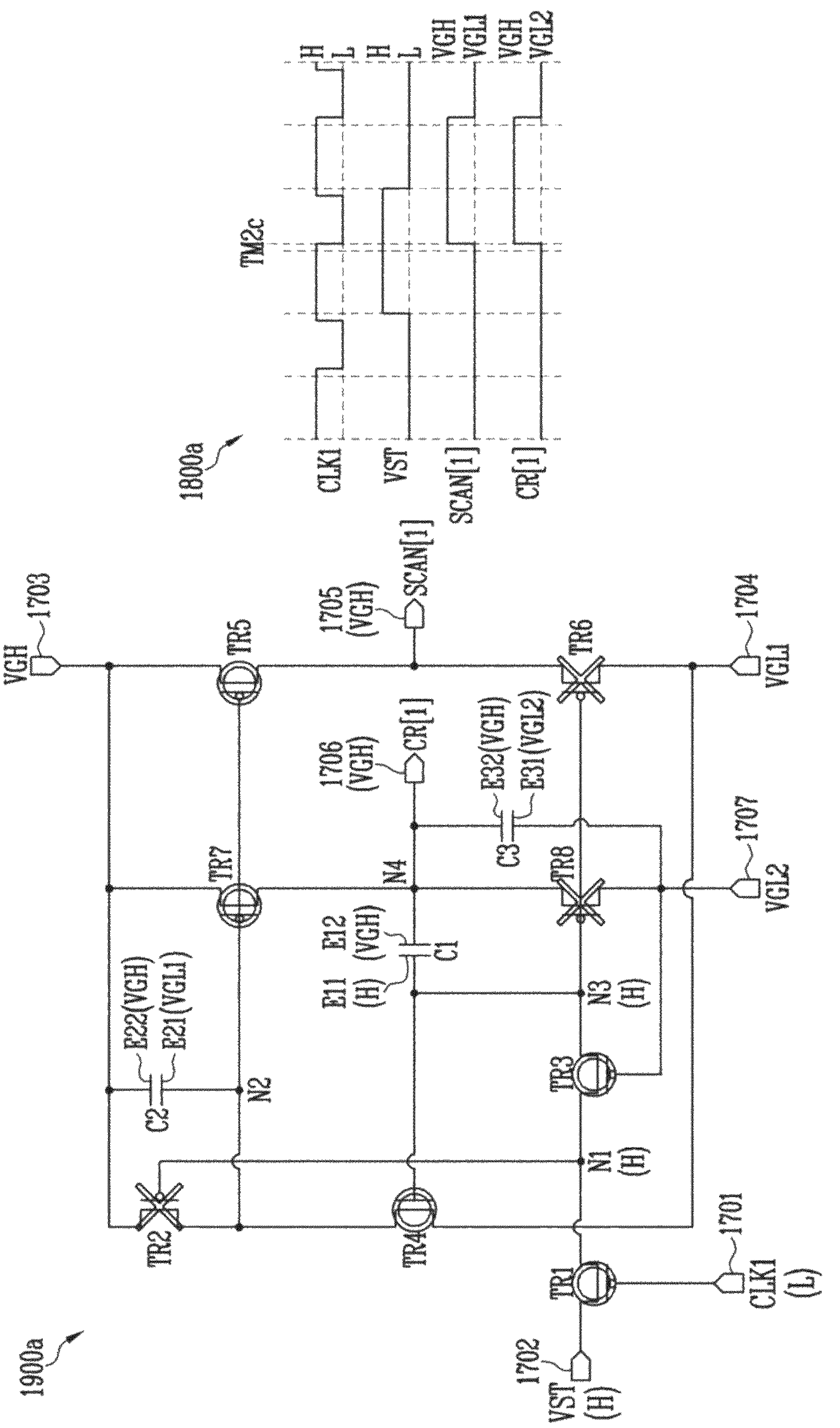
Figure 21:
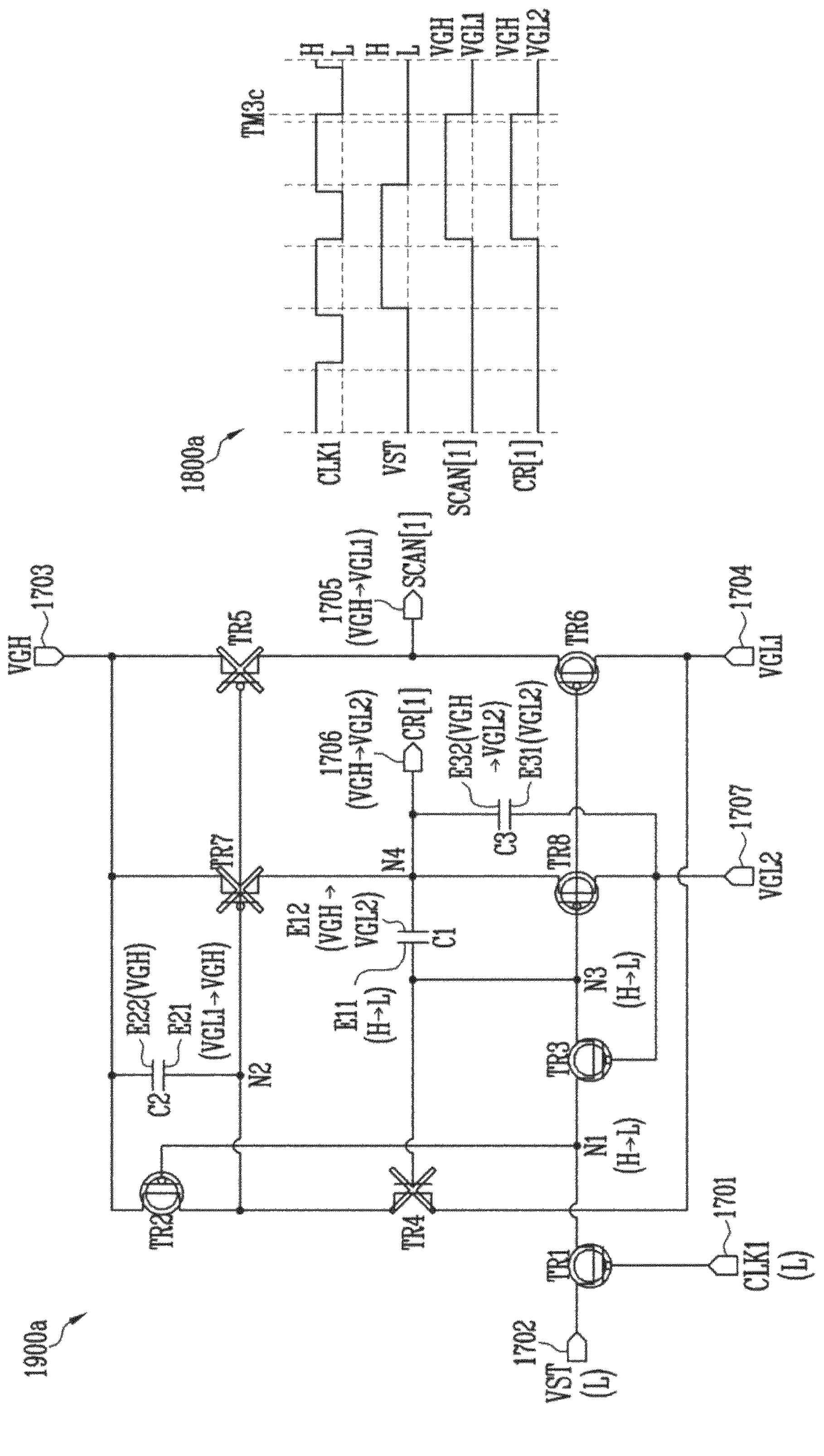

FIGS. 19 to 21 are diagrams illustrating the stage driving method 1800*a* of FIG. 18, with a focus on the stage circuit of FIG. 17.

The stage circuit 1900*a* shown in FIGS. 19 to 21 may correspond to the first stage circuit ST1 of FIG. 4.

FIG. 19 shows the state of the stage circuit 1900*a* at a first time point TM1*c* (or a time point immediately after the first time point TM1*c*).

The first transistor TR1 may be turned on in response to the first clock signal CLK1 at the low level L. When the first transistor TR1 is turned on, a start signal VST having a low level L may be input to the first node N1.

The second transistor TR2 may be turned on when the first node N1 has a low level L. When the second transistor TR2 is turned on, a high level voltage VGH may be applied to the second node N2.

The third transistor TR3 may be turned on in response to the low level voltage VGL2. When the third transistor TR3 is turned on, the third node N3 becomes electrically connected to the first node N1, allowing the start signal VST having the low level L to be input to both the first node N1 and the third node N3.

The fourth transistor TR4 may be turned off by a low level L applied to the third node N3.

The fifth transistor TR5 may be turned off when the second node N2 has a high level voltage VGH.

The sixth transistor TR6 may be turned on when the third node N3 has a low level L. When the sixth transistor TR6 is turned on, the first output terminal 1705 may be electrically connected to the fourth input terminal 1704, allowing the first scan signal SCAN[1] to have the low level voltage VGL1.

The seventh transistor TR7 may be turned off when the second node N2 has a high level voltage VGH.

The eighth transistor TR8 may be turned on when the third node N3 has a low level L. When the eighth transistor TR8 is turned on, the fourth node N4 may be electrically connected with the seventh input terminal 1707, allowing the first carry signal CR[1] to have the low level voltage VGL2.

FIG. 20 illustrates the state of the stage circuit 1900*a* at a second time point TM2*c* (or a time point immediately after the second time point TM2*c*).

The first transistor TR1 may be turned on in response to the first clock signal CLK1 at the low level L. When the first transistor TR1 is turned on, a start signal VST having a high level H may be input to the first node N1.

The second transistor TR2 may be turned off when the first node N1 has a high level H. When the second transistor TR2 is turned off, the second node N2 may be electrically insulated from the third input terminal 1703.

The third transistor TR3 may be turned on in response to the low level voltage VGL1. When the third transistor TR3 is turned on, the third node N3 is electrically connected to the first node N1, and a start signal VST having a high level H may be input.

The fourth transistor TR4 may be turned on when the third node N3 has the high level H. When the fourth transistor TR4 is turned on, the second node N2 may be electrically connected to the fourth input terminal 1704. A low level voltage VGL1 may be applied to the second node N2.

The fifth transistor TR5 may be turned on when the second node N2 has the low level voltage VGL1. When the fifth transistor TR5 is turned on, the first output terminal 1705 may be electrically connected to the third input terminal 1703. The first scan signal SCAN[1] may have a high level voltage VGH.

The sixth transistor TR6 may be turned off when the third node N3 has the high level H. When the sixth transistor TR6 is turned off, the first output terminal 1705 may be electrically insulated from the fourth input terminal 1704.

The seventh transistor TR7 may be turned on when the second node N2 has the low level voltage VGL1. When the seventh transistor TR7 is turned on, the third input terminal 1703 may be electrically connected to the fourth node N4. A high level voltage VGH may be applied to the fourth node N4. The first carry signal CR[1] may have a high level voltage VGH.

The eighth transistor TR8 may be turned off when the third node N3 has the high level H. When the eighth transistor TR8 is turned off, the fourth node N4 may be electrically insulated from the fourth input terminal 1704.

As a result, the first scan signal SCAN[1] may rise from the low level voltage VGL1 to the high level voltage VGH. The first carry signal CR[1] may rise from the low level voltage VGL2 to the high level voltage VGH.

FIG. 21 illustrates the state of the stage circuit 1900*a* at a third time point TM3*c* (or a time point immediately after the third time point TM3*c*).

The first transistor TR1 may be turned on in response to the first clock signal CLK1 at the low level L. When the first transistor TR1 is turned on, a start signal VST having a low level L may be input to the first node N1. The voltage of the first node N1 may drop from the high level H to the low level L.

The second transistor TR2 may be turned on when the first node N1 has a low level L. When the second transistor TR2 is turned on, a high level voltage VGH may be applied to the second node N2. The voltage of the second node N2 may rise from the low level voltage VGL1 to the high level voltage VGH.

The third transistor TR3 may be turned on in response to the low level voltage VGL2. When the third transistor TR3 is turned on, the third node N3 becomes electrically connected to the first node N1 so that the start signal VST having the low level L may be input. The voltage of the third node N3 may drop from the high level H to the low level L.

The fourth transistor TR4 may be turned off when the third node N3 has the low level L. The electrical connection between the second node N2 and the fourth input terminal 504 may be insulated when the fourth transistor TR4 is turned off.

The fifth transistor TR5 may be turned off when the second node N2 has a high level voltage VGH. The electrical connection between the first output terminal 1705 and the third input terminal 1703 may be insulated when the fifth transistor TR5 is turned off.

The sixth transistor TR6 may be turned on when the third node N3 has a low level L. When the sixth transistor TR6 is turned on, the first output terminal 1705 may be electrically connected to the fourth input terminal 1704, allowing the first scan signal SCAN[1] to have the low level voltage VGL1.

The seventh transistor TR7 may be turned off when the second node N2 has a high level voltage VGH. The electrical connection between the second output terminal 1706 and the third input terminal 1703 may be insulated when the seventh transistor TR7 is turned off.

The eighth transistor TR8 may be turned on when the third node N3 has a low level L. When the eighth transistor TR8 is turned on, the fourth node N4 may be electrically connected with the seventh input terminal 1707, allowing the first carry signal CR[1] to have the low level voltage VGL2.

As a result, the first scan signal SCAN[1] may be lowered from the high level voltage VGH to the low level voltage VGL1. The first carry signal CR[1] may drop from the high level voltage VGH to the low level voltage VGL2.

Meanwhile, at the third time point TM3*c*, the voltage of the second electrode E32 of the third capacitor C3 drops from the high level voltage VGH to the low level voltage VGL2. Embodiments of the present disclosure may enable a rapid decrease in the voltage of the fourth node N4 by configuring the third capacitor C3 with a relatively small capacitance. This makes it possible to lower the voltage of the first carry signal CR[1] faster.

Figure 22:
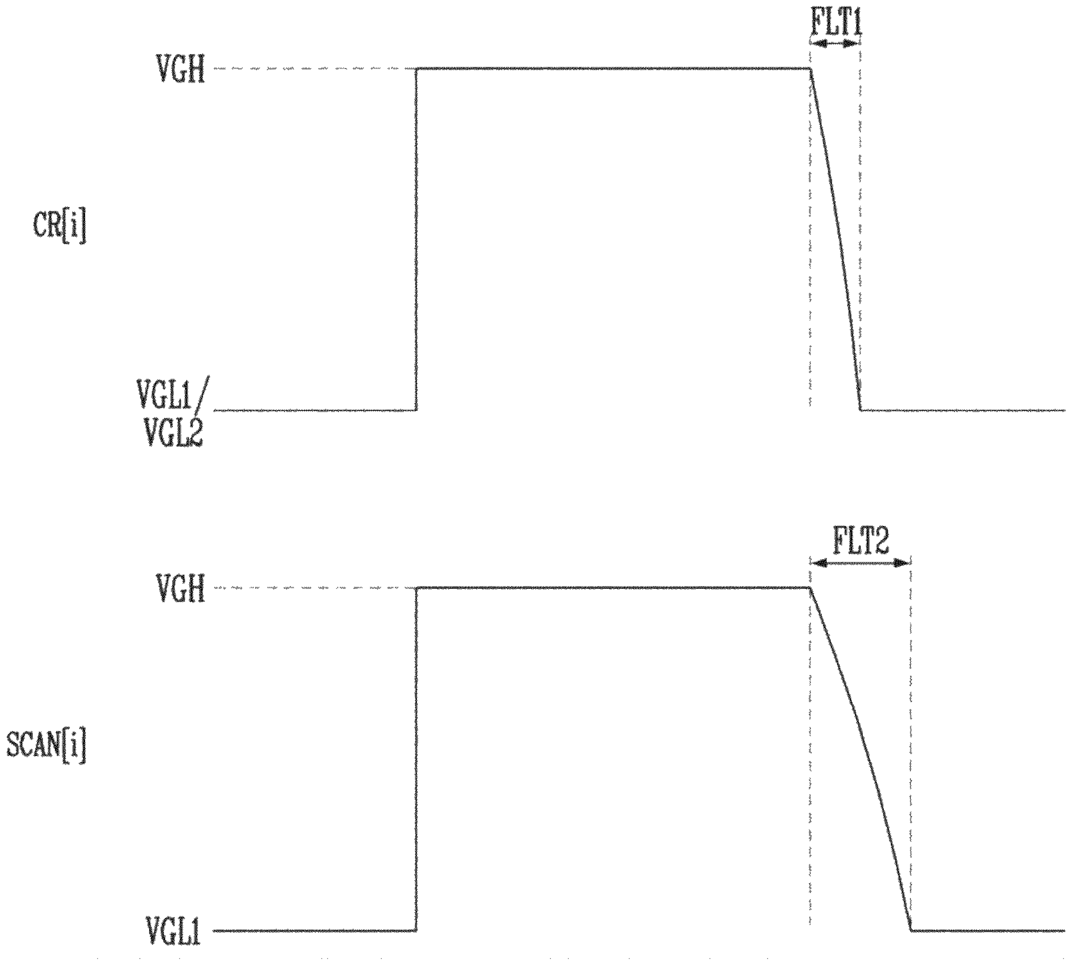
FIG. 22 is a diagram comparing the falling times of the i-th carry signal and the i-th scan signal.

FIG. 22 is a diagram comparing the falling times of the i-th carry signal CR[i] and the i-th scan signal SCAN[i].

Referring to FIG. 22, in embodiments of the present disclosure, the falling time FLT1 at which the i-th carry signal CR[i] drops from the high level voltage VGH to the low level voltage VGL1 or VGL2 is smaller than the falling time FLT2 at which the i-th scan signal SCAN[i] falls from the high level pressure VGH to the low level voltage VGL1.

According to embodiments of the present disclosure, the overall area of the non-display area NDA (see FIG. 1) may be reduced by minimizing the area for the third capacitor C3 (e.g., see FIG. 5).

According to embodiments of the present disclosure, as the falling time FLT1 of the i-th carry signal CR[i] becomes shorter, the reliability of the scan driving circuit 130 (see FIG. 1) may be increased.

The display device 100 (see FIG. 1) according to an embodiment may be applied to various electronic devices DS (see FIG. 1). The electronic device according to an embodiment includes the above-described display device, and may further include a module or device having an additional function other than the display device.

Figure 23:
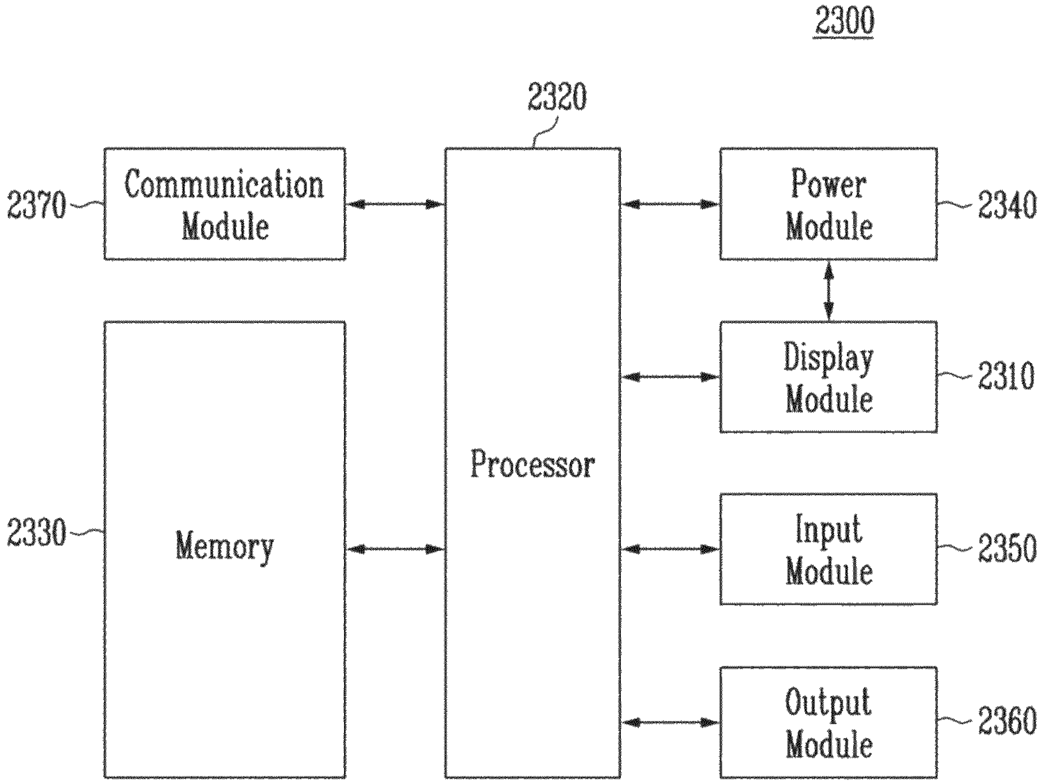
FIG. 23 is a block diagram of an electronic device according to an embodiment.

FIG. 23 is a block diagram of an electronic device 2300 according to an embodiment.

The electronic device 2300 according to the embodiment of FIG. 23 may include the electronic device DS of FIG. 1 described above.

Referring to FIG. 23, an electronic device 2300 according to an embodiment may include a display module 2310, a processor 2320, a memory 2330, and a power module 2340.

The display module 2310 may include the display device 100 of FIG. 1 described above.

The processor 2320 may include at least one of a central processing unit (CPU), an application processor (AP), a graphic processing unit (GPU), a communication processor (CP), an image signal processor (ISP), or a controller. In one embodiment, the processor 2320 may be divided into two or more parts, either functionally or structurally. For example, the processor 2320 may include a main processor in the form of a first driving chip including a central processing unit, and an auxiliary process in the form of the second driving chip including a controller that receives an image signal from the main processor and processes the image signal to meet an interface specification of the display module 2310. The processor 2320 may include the host HST of FIG. 1 described above.

The memory 2330 may include at least one of a non-volatile memory and a volatile memory. The memory 2330 may store data information necessary for operation of the processor 2320 or the display module 2310. When the processor 2320 executes the application stored in the memory 2330, the image data signal and/or the input control signal are transmitted to the display module 2310, and the display module 2310 may process the received signal and output the image information through the display screen.

The power module 2340 may include a power supply module such as a power adapter or a battery device, and a power conversion module that converts power supplied by the power supply module to generate power for the operation of the electronic device 2300. The power conversion by the power conversion module may include, Direct Current (DC)-DC conversion, Alternating Current (AC)-DC conversion and DC-AC conversion, but is not limited to.

The electronic device 2300 may further include an input module 2350, an output module 2360, and/or a communication module 2370.

The input module 2350 may provide input information to the processor 2320 and/or the display module 2310. The input module 2350 may include various sensor modules as well as physical buttons, keyboards, and microphones. Examples of sensor modules may include touch sensors, pressure sensors, distance sensors, position sensors, digitizers, motion recognition sensors, camera sensors, light receiving sensors, photoelectric conversion sensors, temperature sensors, as well as biometric sensors such as blood pressure sensors, blood glucose sensors, electrocardiogram sensors or heart rate sensors.

The output module 2360 may receive information other than the image received from the processor 2320 and provide the information to the user. For example, the output module 2360 may be a non-image output module. Examples of the non-image output module include an acoustic module, a haptic module, a light-emitting module, and the like, and may include other functional modules unique to the electronic device (e.g., a cooling module of a refrigerator, etc.).

The communication module 2370 is a module responsible for transmitting and receiving information between the electronic device 2300 and an external device, and may include a receiving unit and a transmitting unit. The communication module 2370 may include various wireless communication modules such as a mobile communication module, a Wi-Fi module, and a Bluetooth module, or various wired communication modules.

At least one of the above-described components of the electronic device 2300 may be included in the display device according to the above-described embodiments. In addition, some of the individual modules that are functionally included in one module may be included in the display device, and others may be provided separately from the display device. For example, the display device may include a display module 2310, and the processor 2320, the memory 2330, and the power module 2340 may be provided in the form of other devices in the electronic device 2300 other than the display device. As another example, the power module 2340 may be provided in the display device, and power may be supplied to the processor 2320 and the memory 2330 provided in the electronic device 2300 other than the display device, which is not limited to the above example.

Figure 24:
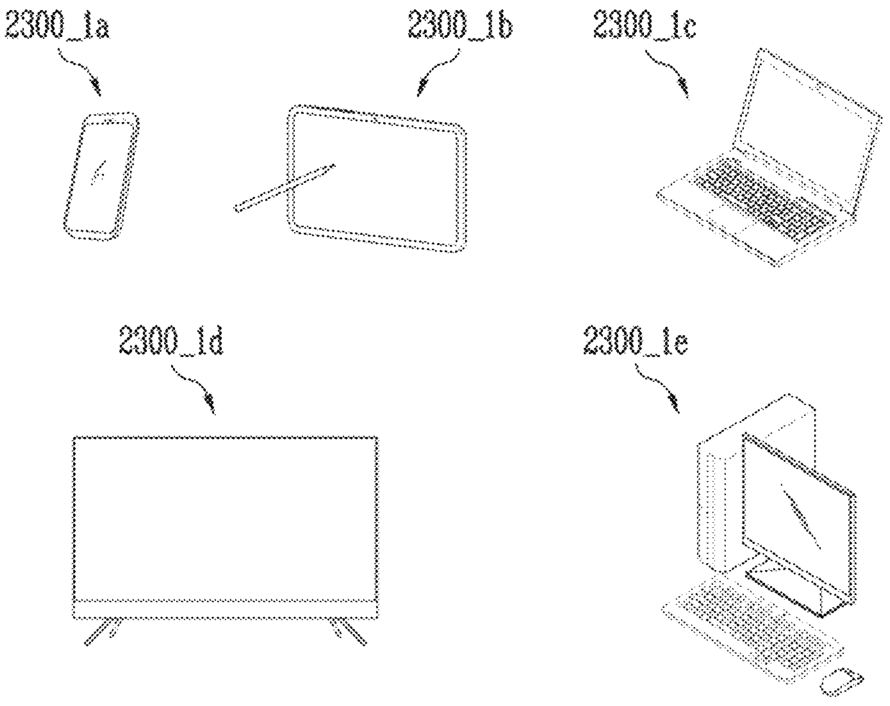
FIGS. 24 to 26 are schematic diagrams of an electronic device according to various embodiments.
Figure 25:
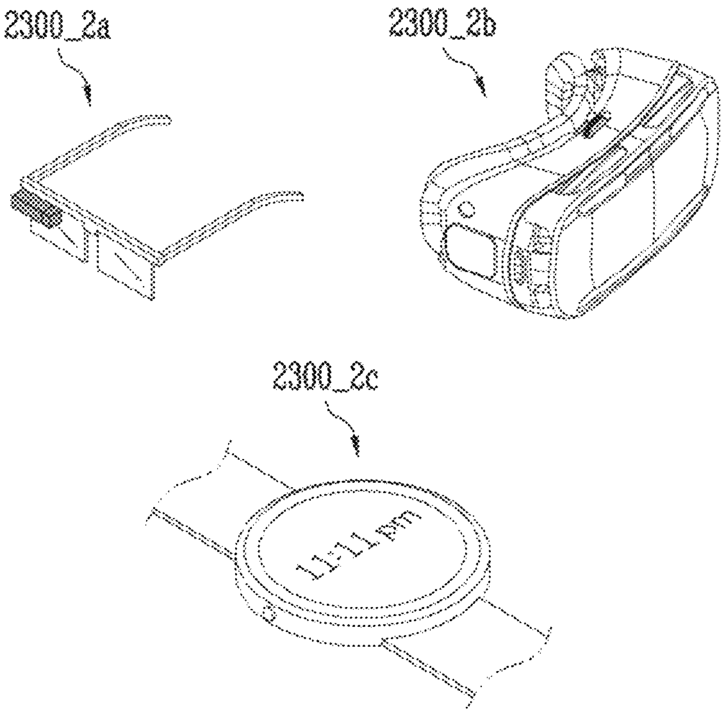
Figure 26:
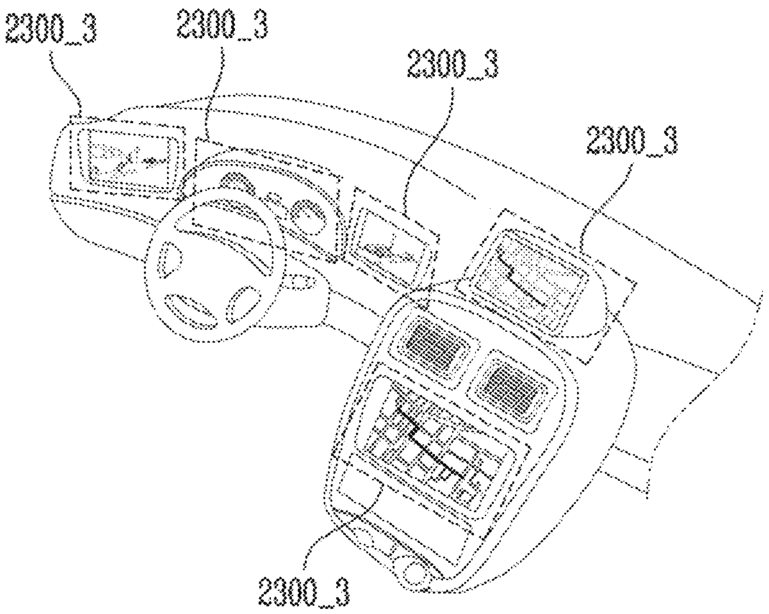

FIGS. 24 to 26 are schematic diagrams of an electronic device 2300 (see FIG. 23) according to various embodiments.

FIGS. 24 to 26 illustrate examples of various electronic devices to which a display device is applied according to embodiments.

FIG. 24 illustrates a smartphone 2300_1*a*, a tablet PC 2300_1*b*, a laptop 2300_1*c*, a TV 2300_1*d*, and a desk monitor 2300_1*e* as examples of electronic devices.

The smartphone 2300_1*a* may include an input module 2350 (see FIG. 23) such as a touch sensor and a communication module 2370 (see FIG. 23) in addition to the display module 2310 (see FIG. 23). The smartphone 2300_1*a* may process information received through the communication module 2370 or other input module 2350 and display the information through the display module 2310 of the display device.

Tablet PCs 2300_1*b*, laptops 2300_1*c*, televisions 2300_1*d*, and desk monitors 2300_1*e* also include a display module 2310 (see FIG. 23) and an input module 2350 (see FIG. 23), and may further include a communication module 2370 (see FIG. 23) in some cases, similarly to smartphone 2300_1*a*.

FIG. 25 illustrates a case where an electronic device including a display module 2310 (see FIG. 23) is applied to a wearable electronic device. The wearable electronic device may be smart glasses 2300_2*a*, a head mounted display 2300_2*b*, a smart watch 2300_2*c*, or the like.

The smart glasses 2300_2*a* and the head mounted display 2300_2*b* may include a display module 2310 (see FIG. 23) that emits a display image, and a reflector that reflects the emitted display screen and provides the reflected display screen to the user's eyes, thereby providing the user with a screen of virtual reality (VR) or augmented reality (AR).

Smartwatch 2300_2*c* may include a biometric sensor as input module 2350 (see FIG. 23). The smart watch 2300_2*c* may provide the biometric information recognized through the biometric sensor to the user through the display module 2310 (see FIG. 23).

FIG. 26 illustrates a case where an electronic device including a display module 2310 (see FIG. 23) is applied to a vehicle. For example, the electronic device 2300_3 may be applied to an instrument panel, a center fascia, or the like of a vehicle, or may be applied to a CID (Center Information Display) disposed on a dashboard of a vehicle or a room mirror display in place of a side mirror.

The electronic device to which the display device according to embodiments is applied may include not only devices mainly displaying a screen such as a billboard, an electric signboard, and a game machine, but also various home appliances displaying information through a display module such as a refrigerator, a washing machine, a dryer, an air conditioner, and a robot vacuum cleaner. In addition, when the display module has a function of transmitting light, the display module may be applied to an electronic device such as a smart window or a transparent display device that displays a background and a display image together. The type of the electronic device according to the embodiment is not limited by the above-described example, and various other electronic devices may be applied.

According to the stage circuit, the display device including the same, and the electronic device including the display device according to the embodiments of the present disclosure, the falling time of the carry signal may be shortened.

According to the stage circuit, the display device including the same, and the electronic device including the display device according to the embodiments of the present disclosure, visibility may be increased.

The drawings and the detailed description of the invention so far referred to are merely illustrative of the invention, which has been used merely for the purpose of describing the invention and not for the purpose of limiting the scope of the invention. It will therefore be appreciated by those skilled in the art that various modifications and equivalent embodiments are possible therefrom.

What is claimed is:

1. A stage circuit comprising:

a first input terminal configured to receive a clock signal;

a second input terminal configured to receive a driving signal;

an output terminal configured to output a carry signal;

an input circuit configured to transmit the driving signal to a first node in response to the clock signal;

a voltage control circuit configured to control voltages of a first control node and a second control node in response to the driving signal transmitted to the first node; and a carry driver circuit including a boosting capacitor connected between the first control node and the output terminal, and a buffer capacitor configured to maintain a voltage of the output terminal.

2. The stage circuit according to claim 1, wherein the input circuit comprises:

a first transistor including a gate electrode electrically connected to the first input terminal, and configured to switch an electrical connection between the second input terminal and the first node.

3. The stage circuit according to claim 1, further comprising:

a third input terminal configured to receive a high level voltage; and a fourth input terminal configured to receive a low level voltage, wherein the voltage control circuit comprises:

a second transistor including a gate electrode electrically connected to the first node and configured to switch an electrical connection between the third input terminal and the second control node;

a third transistor electrically connecting the first node and the first control node;

a fourth transistor including a gate electrode electrically connected to the first control node, and configured to switch an electrical connection between the fourth input terminal and the second control node; and a stabilizing capacitor including a first electrode electrically connected to the second control node and a second electrode electrically connected to the third input terminal.

4. The stage circuit according to claim 3, wherein the buffer capacitor is directly connected to the fourth input terminal.

5. The stage circuit according to claim 3, wherein the second transistor and the third transistor are transistors including a P-type semiconductor, and wherein the fourth transistor is a transistor including an N-type semiconductor.

6. The stage circuit according to claim 3, wherein the third transistor includes a gate electrode electrically connected to the fourth input terminal.

7. The stage circuit according to claim 3, wherein the low level voltage input to the fourth input terminal is a first low level voltage, wherein the stage circuit further includes a seventh input terminal configured to receive a second low level voltage, and wherein the third transistor includes a gate electrode electrically connected to the seventh input terminal.

8. The stage circuit according to claim 7, wherein the second low level voltage is lower than the first low level voltage.

9. The stage circuit according to claim 7, wherein the buffer capacitor is directly connected to the seventh input terminal.

10. The stage circuit according to claim 3, wherein at least one of the second transistor, the third transistor, and the fourth transistor has a four-terminal structure including a back gate electrode.

11. The stage circuit according to claim 1, wherein the output terminal is a second output terminal, wherein the stage circuit further comprises:

a third input terminal configured to receive a high level voltage;

a fourth input terminal configured to receive a low level voltage;

a first output terminal configured to output a scan signal; and a scan output circuit configured to output the scan signal according to voltages of the first control node and the second control node, wherein the scan output circuit comprises:

a fifth transistor configured to switch an electrical connection between the third input terminal and the first output terminal in response to a voltage of the second control node; and a sixth transistor configured to switch an electrical connection between the fourth input terminal and the first output terminal in response to a voltage of the first control node.

12. The stage circuit according to claim 11, wherein each of the fifth transistor and the sixth transistor includes a P-type semiconductor.

13. The stage circuit according to claim 1, further comprising:

a third input terminal configured to receive a high level voltage; and a fourth input terminal configured to receive a low level voltage, wherein the carry driver circuit comprises:

a seventh transistor including a gate electrode electrically connected to the second control node, and configured to switch an electrical connection between the third input terminal and the output terminal; and an eighth transistor including a gate electrode electrically connected to the first control node, and configured to switch an electrical connection between the fourth input terminal and the output terminal.

14. The stage circuit according to claim 13, wherein each of the seventh transistor and the eighth transistor includes a P-type semiconductor.

15. The stage circuit according to claim 1, further comprising:

a fifth input terminal configured to receive a reset signal;

a sixth input terminal configured to receive a low level voltage; and a reset circuit, wherein the reset circuit comprises:

a ninth transistor including a gate electrode electrically connected to the fifth input terminal, and configured to switch an electrical connection between the sixth input terminal and the second control node.

16. A display device comprising:

a display panel including a plurality of pixels and scan lines electrically connected to the plurality of pixels; and a scan driving circuit including a plurality of stage circuits configured to supply scan signals to the plurality of scan lines, wherein at least one of the plurality of stage circuits comprises:

a first input terminal configured to receive a clock signal;

a second input terminal configured to receive a driving signal;

a first output terminal configured to output a scan signal of the scan signals;

a second output terminal configured to output a carry signal;

an input circuit configured to transmit the driving signal to a first node in response to the clock signal;

a voltage control circuit configured to control voltages of a first control node and a second control node in response to the driving signal transmitted to the first node;

a carry driver circuit including a boosting capacitor connected between the first control node and the second output terminal, and a buffer capacitor configured to maintain a voltage of the second output terminal; and a scan output circuit configured to output the scan signal according to voltages of the first control node and the second control node.

17. The display device according to claim 16, further comprising:

a third input terminal configured to receive a high level voltage; and a fourth input terminal configured to receive a low level voltage, wherein the voltage control circuit comprises:

a second transistor including a gate electrode electrically connected to the first node, and configured to switch an electrical connection between the third input terminal and the second control node;

a third transistor electrically connecting the first node and the first control node;

a fourth transistor including a gate electrode electrically connected to the first control node, and configured to switch an electrical connection between the fourth input terminal and the second control node; and a stabilizing capacitor including a first electrically connected to the second control node and a second electrode electrically connected to the third input terminal.

18. The display device according to claim 17, wherein the carry driver circuit comprises:

a seventh transistor including a gate electrode electrically connected to the second control node, and configured to switch an electrical connection between the third input terminal and the second output terminal; and an eighth transistor including a gate electrode electrically connected to the first control node, and configured to switch an electrical connection between the fourth input terminal and the second output terminal.

19. An electronic device comprising:

a processor configured to output input image data;

a display device configured to display an image corresponding to the input image data according to a scan signal generated by a plurality of stage circuits, wherein at least one of the plurality of stage circuits comprises:

a first input terminal configured to receive a clock signal;

a second input terminal configured to receive a driving signal;

a first output terminal configured to output the scan signal;

a second output terminal configured to output a carry signal;

an input circuit configured to transmit the driving signal to a first node in response to the clock signal;

a voltage control circuit configured to control voltages of a first control node and a second control node in response to the driving signal transmitted to the first node;

a carry driver circuit including a boosting capacitor connected between the first control node and the output terminal, and a buffer capacitor configured to maintain a voltage of the second output terminal; and a scan output circuit configured to output the scan signal according to voltages of the first control node and the second control node.

20. The electronic device according to claim 19, wherein the processor further outputs a control signal, and wherein the display device generates a scan driving circuit control signal configured to control driving timing of the stage circuits in response to the control signal.

* * * * *